US011970885B2

(12) United States Patent
Wu

(10) Patent No.: US 11,970,885 B2
(45) Date of Patent: *Apr. 30, 2024

(54) SECURITY LOCK FOR ELECTRONIC DEVICE

(71) Applicant: SINOX CO., LTD, New Taipei (TW)

(72) Inventor: Chia-Ming Wu, New Taipei (TW)

(73) Assignee: SINOX CO., LTD, New Taipei (TW)

( * ) Notice: Subject to any disclaimer, the term of this patent is extended or adjusted under 35 U.S.C. 154(b) by 308 days.

This patent is subject to a terminal disclaimer.

(21) Appl. No.: 17/522,938

(22) Filed: Nov. 10, 2021

(65) Prior Publication Data

US 2022/0065002 A1 Mar. 3, 2022

Related U.S. Application Data

(63) Continuation of application No. 16/565,494, filed on Sep. 10, 2019, now Pat. No. 11,203,886.

(60) Provisional application No. 62/730,906, filed on Sep. 13, 2018, provisional application No. 62/729,308, filed on Sep. 10, 2018.

(51) Int. Cl.
*E05B 73/00* (2006.01)

(52) U.S. Cl.
CPC .. *E05B 73/0082* (2013.01); *E05B 2073/0088* (2013.01)

(58) Field of Classification Search
CPC ................ E05B 73/00; E05B 73/0082; E05B 2073/0088
USPC ............................................................ 70/58
See application file for complete search history.

(56) References Cited

U.S. PATENT DOCUMENTS

| | | | | |
|---|---|---|---|---|
| 6,205,824 | B1 * | 3/2001 | Miao | E05B 73/0005 70/57 |
| 6,536,244 | B1 * | 3/2003 | Chang | E05B 73/0082 70/49 |
| 9,187,934 | B1 * | 11/2015 | Lee | E05B 73/0017 |
| 2007/0295040 | A1 * | 12/2007 | Lee | A47F 7/024 70/58 |
| 2012/0227448 | A1 * | 9/2012 | Su | E05B 73/0005 70/58 |
| 2018/0363334 | A1 * | 12/2018 | Wu | E05B 73/0005 |
| 2020/0080346 | A1 | 3/2020 | Wu | |

FOREIGN PATENT DOCUMENTS

| | | |
|---|---|---|
| TW | M508581 | 9/2015 |
| TW | M553352 | 12/2017 |

OTHER PUBLICATIONS

Office action by TIPO, dated Jun. 7, 2021.

* cited by examiner

*Primary Examiner* — Nathan Cumar
(74) *Attorney, Agent, or Firm* — Birch, Stewart, Kolasch & Birch, LLP

(57) ABSTRACT

A security apparatus having a lock head and lock body is disclosed. The lock head includes lock fingers capable of shifting horizontally. When collapsed, the lock fingers may be withdrawn from a security slot of a portable electronic device. Engaging members are set at the lock head and lock body respectively such that the two can be secured together or be readily removable from each other when needed. The lock body includes a locking mechanism operably coupled to the lock head. Configurations of the lock fingers are alterable via the locking mechanism. The lock head and the locking mechanism are on different planes.

16 Claims, 21 Drawing Sheets

A′-A′

B-B

B′-B′

SECURITY LOCK FOR ELECTRONIC DEVICE

CROSS REFERENCE TO RELATED APPLICATION

This non-provisional application is a Continuation Application of U.S. Non-Provisional application Ser. No. 16/565,494 filed on Sep. 10, 2019. The present application claims priority to U.S. Provisional Application Ser. No. 62/729,308, filed on Sep. 10, 2018, and U.S. Provisional Application Ser. No. 62/730,906, filed on Sep. 13, 2018, which are hereby incorporated by reference in their entirety.

FIELD

The present disclosure relates to a security lock for electronic devices and more particularly to a portable electronic device security lock with exchangeable lock head.

BACKGROUND

Portable electronic devices (e.g., laptops, tablets or personal digital assistants) in the past are heavy and bulky, sometimes with a thickness of at least a few centimeters. The extra thickness, however, gave manufacturers more flexibility in designing the dimension of a security slot. Security slot is where a compatible lock apparatus can be inserted into to lock the portable electronic device.

Nowadays, portable electronic devices are thinner and more light-weight, thereby significantly reduces the dimension available for the security slot. Traditional security locks may no longer be compatible with the security slots on the thinner new devices. For example, new portable electronic device may be undesirably tilted when an older security lock with an oversized lock cylinder is engaged with the security slot.

For design purposes, portable electronic device manufacturers may choose to implement different lock slot designs on their devices. For example, the dimension, height or shape of the security slot may differ. Different security slots would require different compatible locks, which inevitably increases costs.

There is a need to develop a novel security lock that is compatible with thinner portable devices and can also engage with security slots of different designs/dimensions.

SUMMARY

The present disclosure concerns a security apparatus for a portable (electronic) device, and the security apparatus includes two portions, i.e., a lock head and a lock body. More specifically, the lock head includes multiple lock fingers and a first engaging member. The lock fingers extend out of the lock head and are alterable between a first state and a second state. Additionally, the multiple lock fingers are in the first state when the lock head is secured to an interface/slot of a portable device, and the multiple lock fingers are in the second state when the lock head is readily removable from the interface of the portable device. The lock body further includes a first compartment, a second engaging member and a second compartment. The first compartment receives the lock head via an opening of the first component. The second engaging member is proximate to the opening and be complementary to the first engaging member. The second engaging member engages with the first engaging member to secure the lock head to the lock body when the lock fingers are in the first state. The second compartment accommodates a locking mechanism, which is operably coupled to the lock head. The states of the lock fingers are alterable via the locking mechanism. Moreover, the lock head and the locking mechanism are axially spaced apart.

In some embodiments, the lock fingers are in the second state when the first and second engaging member are disengaged and the lock head is readily removable from the lock body to be replaced by a different lock head.

In some embodiments, the plurality of lock fingers shift in horizontal direction to increase friction with an inner wall of the interface.

In some embodiments, the lock head has a first longitudinal axis extending from a distal end to an opposite proximal end of the lock head, and the locking mechanism has a second longitudinal axis extending from a distal end to an opposite proximal end of the locking mechanism. Further, the first longitudinal axis is offset from the second longitudinal axis for a distance.

In some embodiments, the first longitudinal axis and the second longitudinal axis are non-coaxial.

In some embodiments, the first longitudinal axis and the second longitudinal axis are parallel to each other.

In some embodiments, the lock body includes a bottom, and the second longitudinal axis is $\leq 3$ millimeters above the bottom.

In some embodiments, the lock body includes a bottom, and the plurality of lock fingers are no more than 2.6 millimeters above the bottom.

In some embodiments, the lock head further comprises a fixing element configured to prevent the lock head from being removed from the lock body when the plurality of lock fingers are in the second state.

In some embodiments, the lock body further includes a stabilizing element adapted to alter the states of the plurality of lock fingers corresponding to the locking mechanism's operation.

In some embodiments, the stabilizing element is slideable between a first position and a second position, and the stabilizing element is in the first position when the plurality of lock fingers are in the first state, and the first position is closer to the interface than the second position.

In some embodiments, the locking mechanism further includes a switch adapted to hold the plurality of lock fingers in the first state and to release the plurality of lock fingers from the first state.

In some embodiments, the locking mechanism further comprises an actuator for cooperating with the switch to alter the plurality of lock fingers between the first and second states.

In some embodiments, the lock head and the locking mechanism are on different planes.

In some embodiments, the different planes are parallel with each other.

In some embodiments, the different planes intersect with each other at an angle 0-90 degrees.

In some embodiments, the lock head sits on a first plane which passes through a central longitudinal axis of the lock head, and the locking mechanism sits on a second plane which passes through a central longitudinal axis of the locking mechanism, and the first plane and the second plane are spaced apart.

In some embodiments, the first and second planes are horizontal planes.

In some embodiments, the lock body includes a bottom, and the second horizontal plane is ≤3 millimeters above the bottom.

In some embodiments, the lock head is pre-installed and not readily removable from the lock body.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed. Certain parts of the drawings are exaggerated for explanation purposes and shall not be considered limiting unless otherwise specified.

FIG. 2A is an exploded view of the lock, and FIG. 2B is the perspective view of the lock.

FIG. 3A is a perspective view; FIG. 3B is a side view; and FIGS. 3C to 3F are the sectional view of the lock.

FIG. 4 is an exploded view of the lock of the second embodiment.

FIGS. 5A and 5D are the perspective views of the second embodiment; and FIGS. 5B, 5C, 5E and 5F are the sectional views of the second embodiment.

FIGS. 6A and 6B are perspective views of the third embodiment;

FIG. 6C is an exploded view of the third embodiment; FIG. 6D is a top view of the third embodiment; and FIGS. 6E to 6I are the sectional views of the third embodiment.

FIGS. 6A and 6B are perspective views of the fourth embodiment; and FIGS. 7C and 7D are the sectional views of the fourth embodiment.

FIG. 8A is a perspective view of the lock, and FIG. 8B is an exploded view of the lock.

FIG. 9A is a front view of the lock; FIG. 9B is a sectional view of the lock; and FIG. 9C is a perspective view of the lock.

FIGS. 10A and 10C are top views of the lock; and FIGS. 10B and 10D are sectional views of the lock.

Figure 1A:
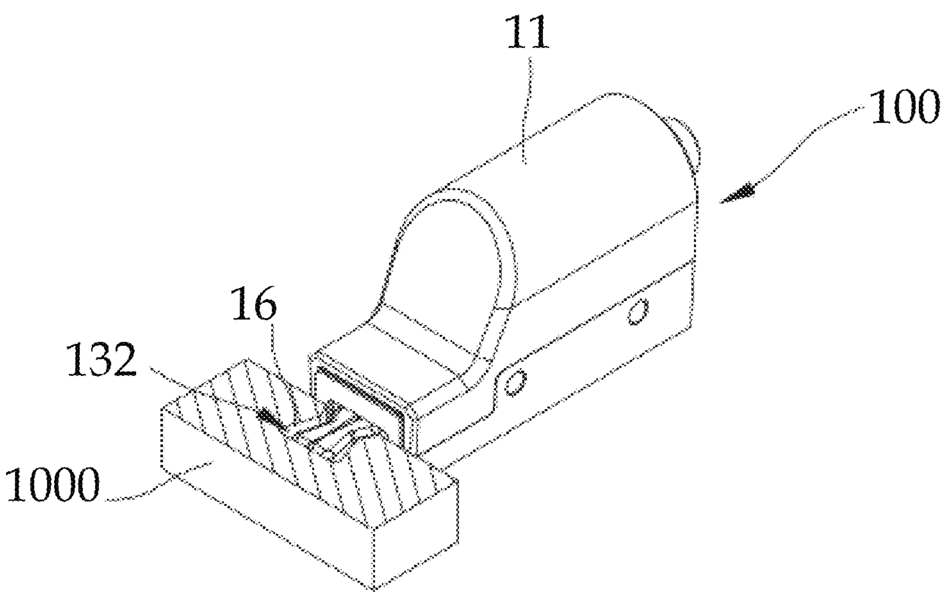
FIGS. 1A to 1B are diagrams of an exemplary lock according to the present disclosure.

The drawings are only schematic and are non-limiting. In the drawings, the size of some of the elements may be exaggerated and not drawn on scale for illustrative purposes. The dimensions and the relative dimensions do not necessarily correspond to actual reductions to practice of the disclosure. Any reference signs in the claims shall not be construed as limiting the scope. Like reference symbols in the various drawings indicate like elements.

DETAILED DESCRIPTION OF THE DISCLOSURE

The making and using of the embodiments of the disclosure are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Throughout the various views and illustrative embodiments, like reference numerals are used to designate like elements. Reference will now be made in detail to exemplary embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

In the drawings, like reference numbers are used to designate like or similar elements throughout the various views, and illustrative embodiments of the present disclosure are shown and described. The figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

It will be understood that when an element is referred to as being "on" another element, it can be directly on the other element or intervening elements may be present. In contrast, when an element is referred to as being "directly on" another element, there are no intervening elements present.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

It will be understood that elements described as "under" or "below" other elements would then be oriented "over" or "above" the other elements. The exemplary terms "under" or "below" can, therefore, encompass both an orientation of over and under.

Unless otherwise defined, all terms (including technical and scientific terms) used herein have the same meaning as commonly understood by one of ordinary skill in the art to which this disclosure belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 1B:
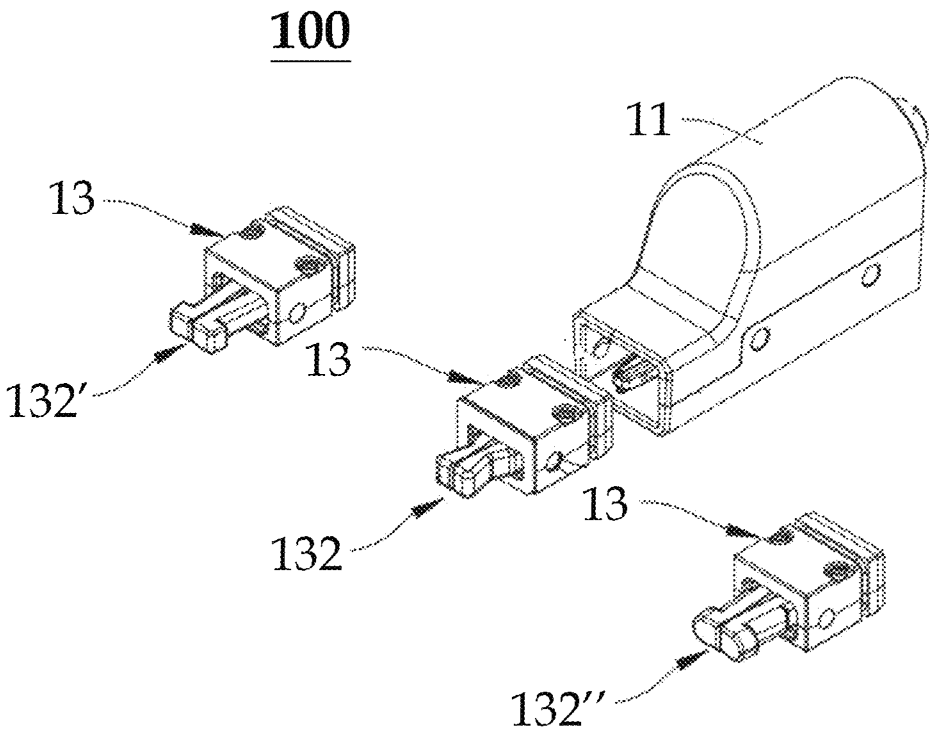

FIGS. 1A to 1C disclose a first embodiment of the present disclosure. A lock 100 (alternative security lock or security apparatus, which may be used interchangingly through the disclosure) is used to secure an electronic device 1000 (only partially depicted for purposes of clarity and non-obstruction of the lock 100 and components thereof). The electronic device 1000 may be, but is not limited to, a laptop, a personal digital assistant or a tablet. The electronic device 1000 is designed with an interface, e.g., a slot 16, usually at its outer casing. The slot 16 may have various sizes, shapes or dimensions depending on the choices of the electronic device manufacturer. Via the slot 16, the lock 100 may lock and secure the electronic device 1000. As FIGS. 1A and 1B disclose, the lock 100 includes a lock body 11 and a lock head 13. There are engagement elements 132, 132', 132" extending from the lock head 13 for engaging with the slot 16 of the electronic device 1000. The lock head 13 is detachably coupled to one end of the lock body 11. With the combination of the foregoing, i.e., the i) different engagement elements and ii) interchangeable lock heads, the lock 100 of the present disclosure is capable of engaging with and providing security to electronic devices with different slots 16. In other words, different engagement elements 132, 132', and 132" may be interchangingly installed on the same lock 100/lock body 11 depending on the different kinds of slot 16 the user's electronic device has. In another example, a manufacturer of the lock 100 may only need to manufacture one type of lock body 11 to be paired with multiple engagement elements 132, 132', and 132". Accordingly, manufacture process may be streamlined and become more cost effective. It is important to note that, in certain embodiments, the lock head 13 may not be interchangeable. In other words, the lock head 13 is preinstalled on the lock body 11 during manufacture. The lock head 13 then becomes not readily removable from the lock body 11.

Figure 2A:
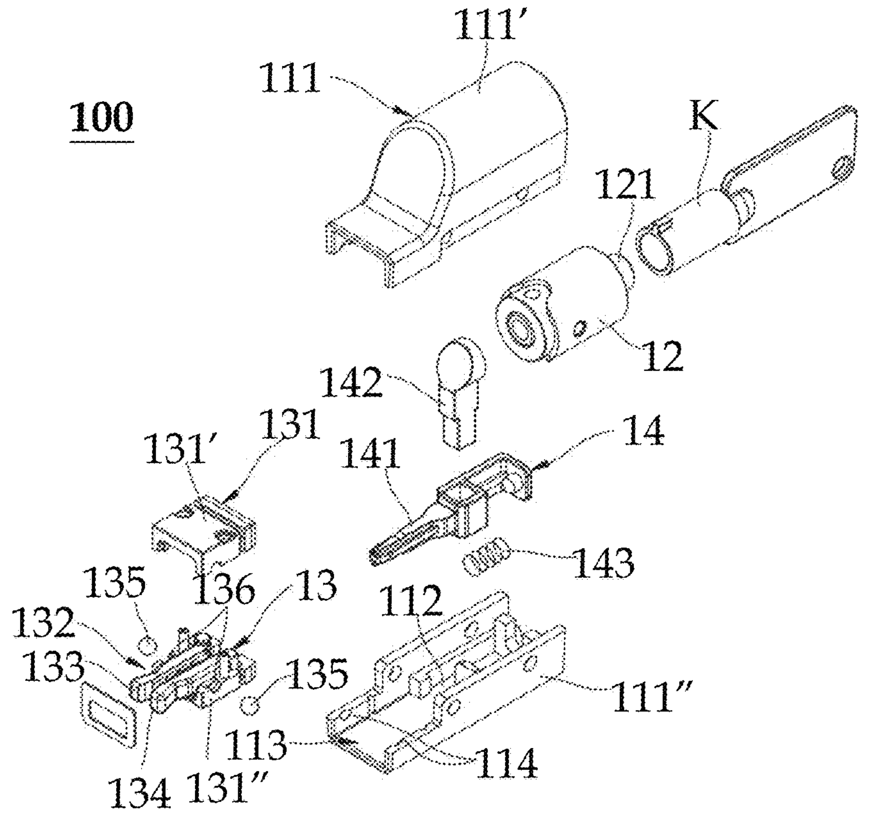
FIGS. 2A to 2B disclose a first embodiment of the lock according to the present disclosure.
Figure 2B:
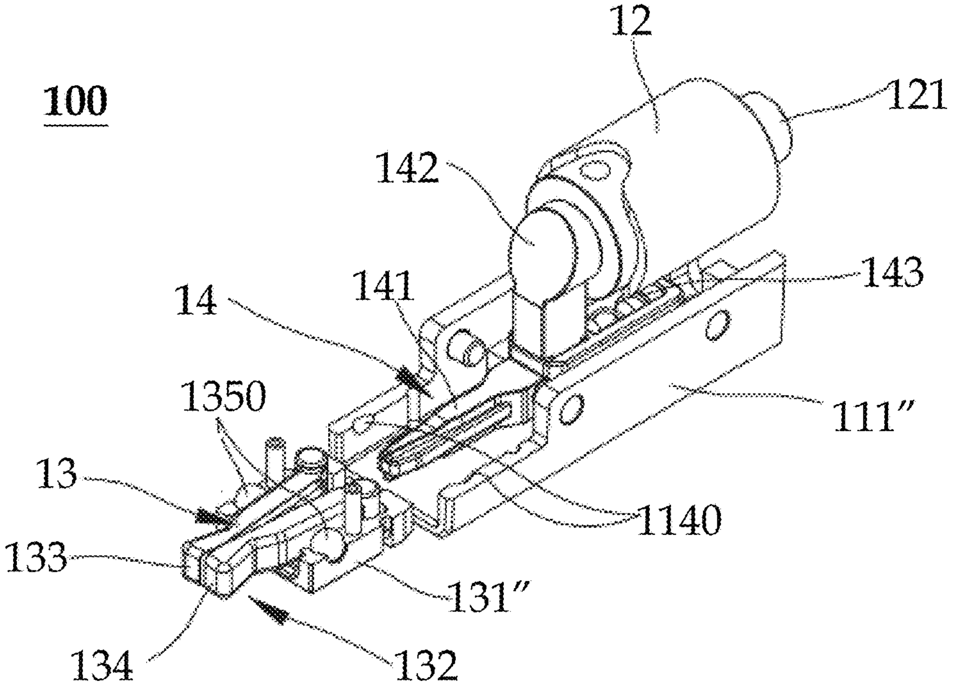

As stated, the lock 100 primary includes two portions, the lock body 11 and the lock head 13. FIG. 2A is an exploded view of the lock 100 and FIG. 2B is a partial perspective view of an assembled lock 100 (some components removed on purpose for clarity). As the figures show, the lock body 11 includes a housing 111 for receiving a locking mechanism, e.g., a lock cylinder 12 and a movable/slideable stabilizing element 14 and/or other relevant components. The housing 111 may include a cover 111' and a base 111", together forming a space for receiving components of the lock 100. The distal end (closer to the electronic device 1000 and the slot 16) of the lock body 11 is provided with a first compartment, and the proximate end (away from the electronic device 1000 and the slot 16) of the housing 111 is provided with a second compartment. The first compartment mainly receives the lock head 13, and the second compartment mainly receives the lock cylinder 12. The stabilizing element 14 is disposed mainly in the second compartment, with parts of it extending into the first compartment. Specifically, the stabilizing element 14 includes a latch 141, a linkage 142, and an elastic member 143. The latch 141 is designed to interact with the engagement element 132 to switch between first (locked) state and second (unlocked) state. The elastic member 143 may be, but is not limited to, a spring or an elastomer, capable of providing resilience or elastic force. Further, the housing 111 has space 112 used to receive the stabilizing element 14. An opening 113 is at the distal end of the housing 111 and connects with the space 112. Via the opening 113, the stabilizing element 14 may extend out of the lock body 11. The opening 113 is also the entrance of the lock head 13 into the lock body 11. When entered, the engagement elements 132, 132', and 132" may interact with the stabilizing element 14 and switch between a first state (a locked state, where the lock head is secured to the lock slot 16) and a second state (an unlocked state, where the lock head is readily removable from the lock slot 16) (to be discussed in more details in later paragraphs). The lock cylinder 12 of the present embodiment is a key lock operated by a key K, and the lock cylinder 12 includes a lock rod 121 passing through the center of the lock cylinder 12. A user may switch the engagement elements 132, 132', and 132" from the first state to the second state by turning the key K. The foregoing operation actuates the lock rod 121, the linkage 142, the latch 141 and/or the elastic member 143 to change the states of the engagement element 132.

More specifically, in some embodiments of the present disclosure, different lock heads 13 may be inserted and coupled to the lock body 11 via the opening 113 of the housing 111. In other words, the lock head 13 is interchangeable and can be replaced by a different one. Such design allows users to switch the lock head on his/her own when needed. The foregoing is accomplished by a first engaging member 135 at the lock head 13 and a second engaging member 114 at the lock body 11. In FIGS. 2A and 2B, the first engaging member 135 may be the positioning ball 135, and the second engaging member 114 may be the insertion groove 114. The positioning ball 135 and the insertion groove 114 cooperates such that the lock head 13 cannot be removed from the lock body 11 when the engagement element 132 is in the first state, and can be removed from the lock body 11 when the engagement element 132 is in the second state. In any case, the first and second engaging members are complementary to each other such that when engaged, they are not readily separable from each other.

As FIG. 2A discloses, the lock head 13 includes a lock head body 131, an engagement element 132, and two first engaging members 135. The lock head body 131 includes a cover 131' and a base 131", together defining an internal space for accommodating the positioning members (e.g., 135) and at least partially the engagement element 132. Specifically, at least part of the engagement element 132 is received by the lock head body 131, and the rest extending from the lock head body 131 so as to be inserted into the slot 16 and engage with the electronic device 1000. In some embodiments, the engagement elements 132 are two lock fingers 133, 134 that can alter between the first state (locked state, expanded) and the second state (unlocked state, collapsed). When inserted into the slot 16 and switched to the first state, the lock fingers 133, 134 are in contact with the internal surface of the slot 16. Such contact creates friction and resistance such that the lock fingers 133, 134 are not readily retractable from the slot 16. The lock head 13, and thus the security lock 100, is secured to the electronic device 1000. The first engaging member 135 may be called positioning members and more particularly positioning balls 1350 (See FIGS. 3D and 3F). The positioning members/first engaging member 135 are complementary in shape with the second engaging members 114, here the insertion grooves 1140 (See FIGS. 3D and 3F).

FIG. 2B demonstrates the configuration where the lock head 13 and the lock body 11 are not engaged. Here, the lock head 13 is in the unlocked state, meaning the engagement element 132 is in the second state. As FIG. 2B shows, the two positioning balls 1350 are respectively disposed in a through hole 136 on each sidewall of the lock head body 131. It is worth to know that part of the positioning ball 1350 is in contact with the surface of the lock fingers 133, 134 respectively, and another part of the positioning ball 1350 is revealed by the through hole 136 and visible to users. Moreover, through the through hole 136, the positioning members 135 may extend out of the lock head body 131 so as to engage with the second engaging member, i.e., the insertion groove 114. The foregoing is achieved by the movement of the lock fingers 133, 134. When the lock fingers 133, 134 are in the first state, tips thereof shift in horizontal direction in the X-Y plane so as to widen its dimension. As a result, the lock fingers 133, 134 become in contact with the internal surface of the slot 16, creating a secured engagement. The outward-shifting of the lock fingers 133, 134 also leads to displacement of the positioning members 135. Essentially, the positioning members 135 are pushed outwardly by the lock fingers 133, 134 and at least some part of the positioning members 135 extends out of the lock head body 131 to engage the insertion groove 1140. The extension of the positioning members 135 is then maintained due to the position of the latch 141 and so is its engagement with the insertion groove 1140. As such, the lock head 13 is secured to the lock body 11 when the lock fingers 133, 134 are in the first state. In some embodiments the positioning balls 1350 are free to move within the through hole 136, even though only for a slight extent, when the lock fingers 133, 134 are in the second state. In sum, the first engaging member 135 (e.g., positioning member 135 or positioning ball 1350) and second engaging member 114 (e.g., insertion groove 1140) are complementary with each other, and when engaged they secure the lock head 13 to the lock body 11. On the other hand, when the first and second engaging members are not engaged, the lock head 13 is readily removable from the lock body 11. As a result, the lock head becomes interchangeable, meaning a user may choose an ideal lock head 13 to use with a matching slot 16 of the electronic device 1000. Moreover, the engagement of the lock fingers 133, 134 with the interface 16 correspond to the engagement of the first and second engaging members. When the lock fingers 133, 134 are secured to the interface 16, they shift outwardly (like an opening scissor) so first and second engaging members are engaged. Thus, the electronic device 1000 cannot be removed from the lock 100, resulting in desired security. On the other hand, when the lock fingers 133, 134 are not secured to the interface 16, they are collapsed so the first and second engaging members are not engaged. Thus, the electronic device 1000 is readily removable from the lock 100. Meanwhile, the lock head 13 is readily removable from the lock body 11 such that users may replace the lock head with another one.

Figure 3A:
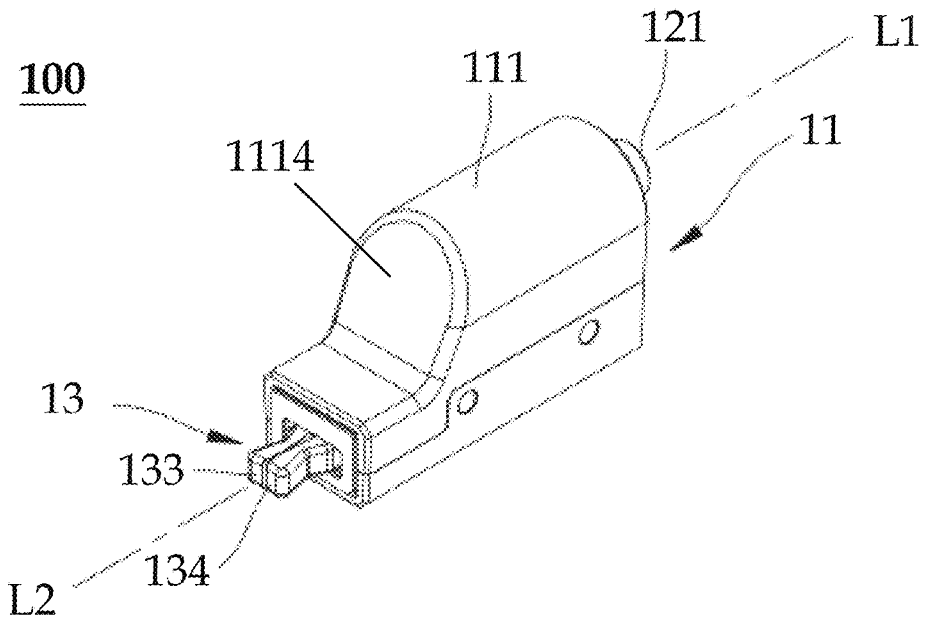
FIGS. 3A to 3F also disclose the first embodiment of the lock according to the present disclosure.
Figure 3B:
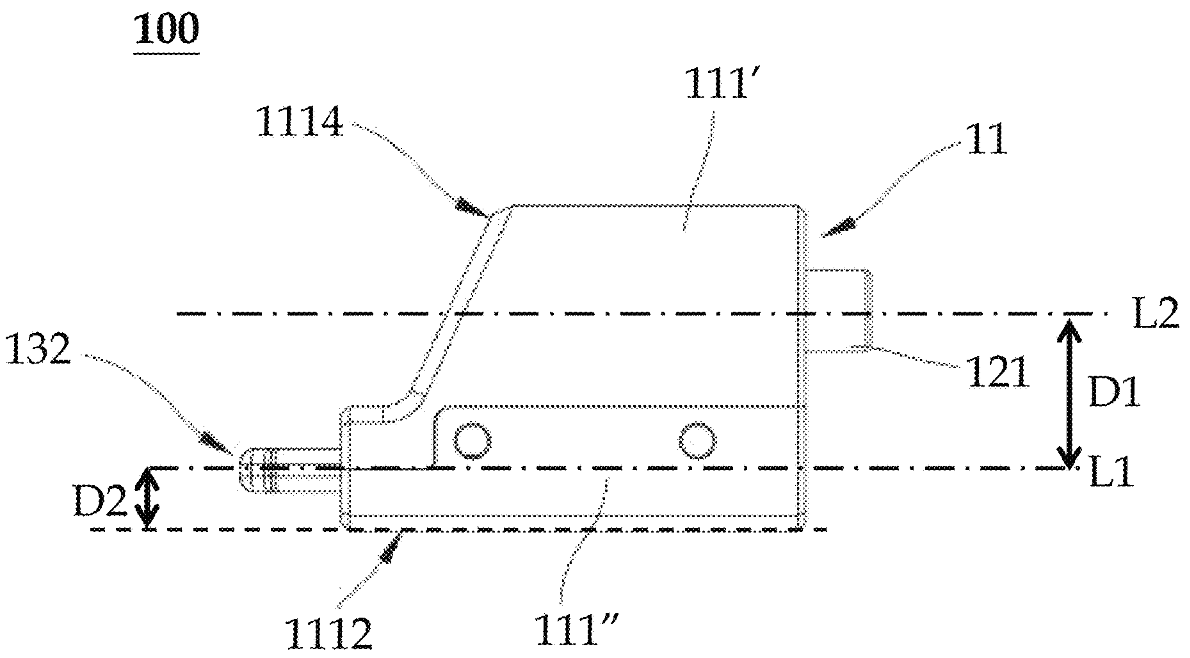

FIGS. 3A to 3F disclose certain embodiments showing the relationship between the lock head 13 and the lock body 11. For ergonomic purposes, the locking mechanism, e.g., the lock cylinder 12 (obstructed by other components so not readily shown in this figure. Please see FIG. 3C) and the lock rod 121, are particularly set at an elevated position of the lock 100, comparing to the lock head 13. In certain embodiments, the locking mechanism 12 and the lock head 13 are axially spaced apart. From another perspective, locking mechanism 12 and the lock head 13 are on different planes, thus having a distance therebetween. For example, in FIG. 3A, a first longitudinal axis L1 passes through the lock head 13 and a second longitudinal axis L2 passes through the lock cylinder 12. The first longitudinal axis L1 extends from a distal end to an opposite proximal end of the lock head 13, and the second longitudinal axis extends from a distal end to an opposite proximal end of the locking mechanism/lock cylinder 12. The axis L1 is offset from the axis L2 for a distance. In other words, the axis L1 and axis L2 are non-coaxial. As a result, the lock cylinder 12 (locking mechanism) and the lock head 13 are axially spaced apart. The axis L1 and axis L2 may be parallel with each other, as FIGS. 3A and 3B shows. In other embodiments, the axis L1 and axis L2 may intersect. In one example, axis L1 is horizontal in terms of the X-Y plane and axis L2 is angled, i.e., not horizontal. In other words, the lock cylinder 12 might be tilted for design or ergonomic purposes. Referring back to FIG. 3B, there is a shortest distance D1 between the first axis and the second axis, and the distance D1 is at least 1 millimeters. Moreover, the lock includes a bottom 1112, and the axis L1 is ≤3 millimeters (distance D2 in FIG. 3B) above the bottom 1112. The foregoing features increase the functionality of the lock 100 and make it easier to use. As stated, modern electronic devices are thinner and lighter, limiting the dimension available for the security slot. For example, the height of the security slot will be severely restricted by the thickness of the device. As such, a low-profile design of the lock head 13 (axis L1 close to the bottom 1112) allows the lock head 13 to couple to the slot 16 without encumbrance. On the other hand, if the locking mechanism is set at the similar height level of the lock head 13, operation of the lock 100 will be obstructed. For example, during operation of the lock 100, and more particularly the lock rod 121, the operator's hand may come in contact with the electronic device itself. His/her hand may also come in contact with the object supporting the electronic device, e.g., table top. The foregoing increase the difficulty when operating the security lock. As such, the position of the locking cylinder 12 of the present disclosure is set higher from the bottom 1112 than the lock head 13. Room is created for user's hand to operate the lock 100. A user can operate the lock 100 with his/her thumb on the slanted wall 1114 of the lock body 111 while other finger(s) presses the lock rod 121.

Figure 3C:
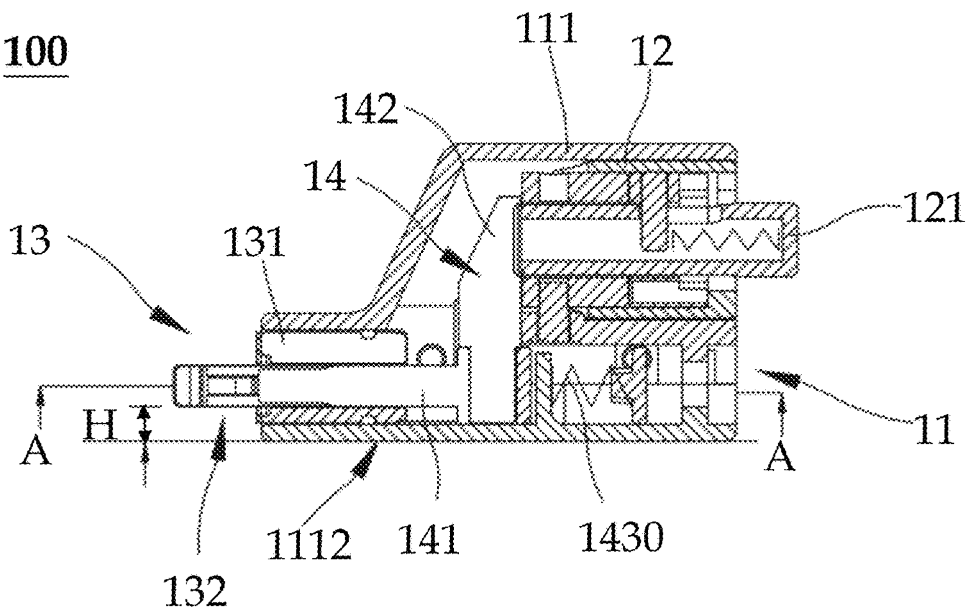
Figure 3D:
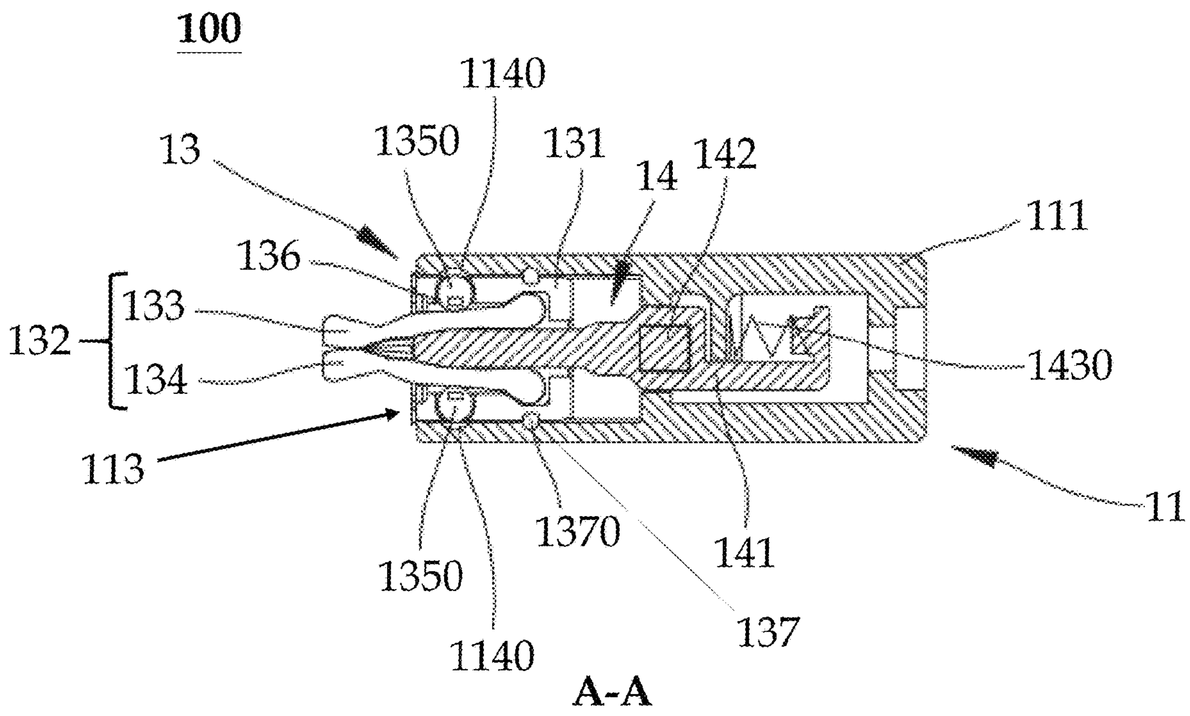
Figure 3E:
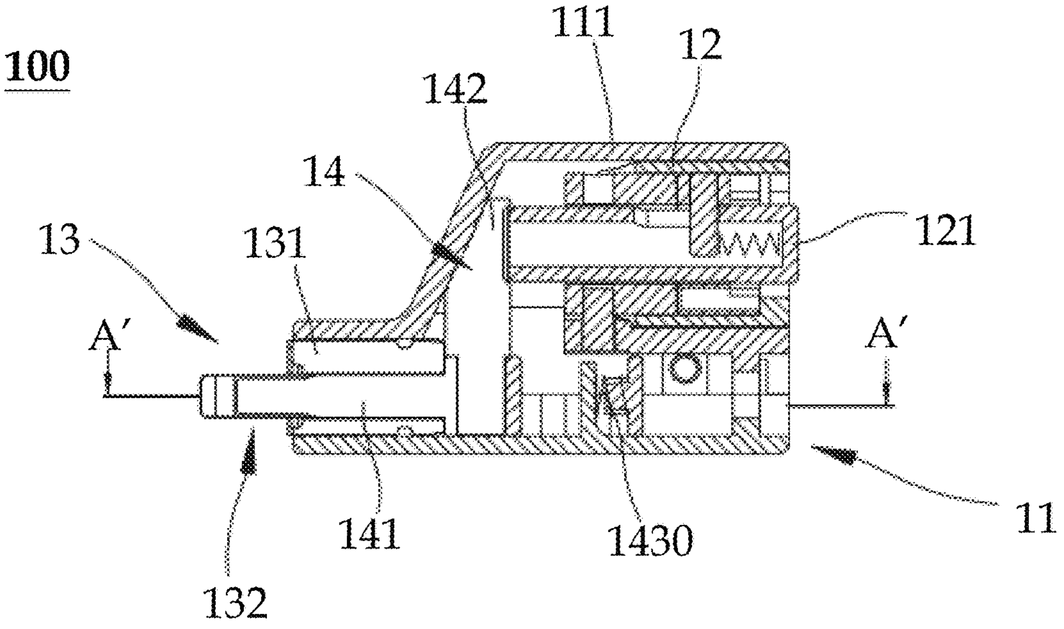
Figure 3F:
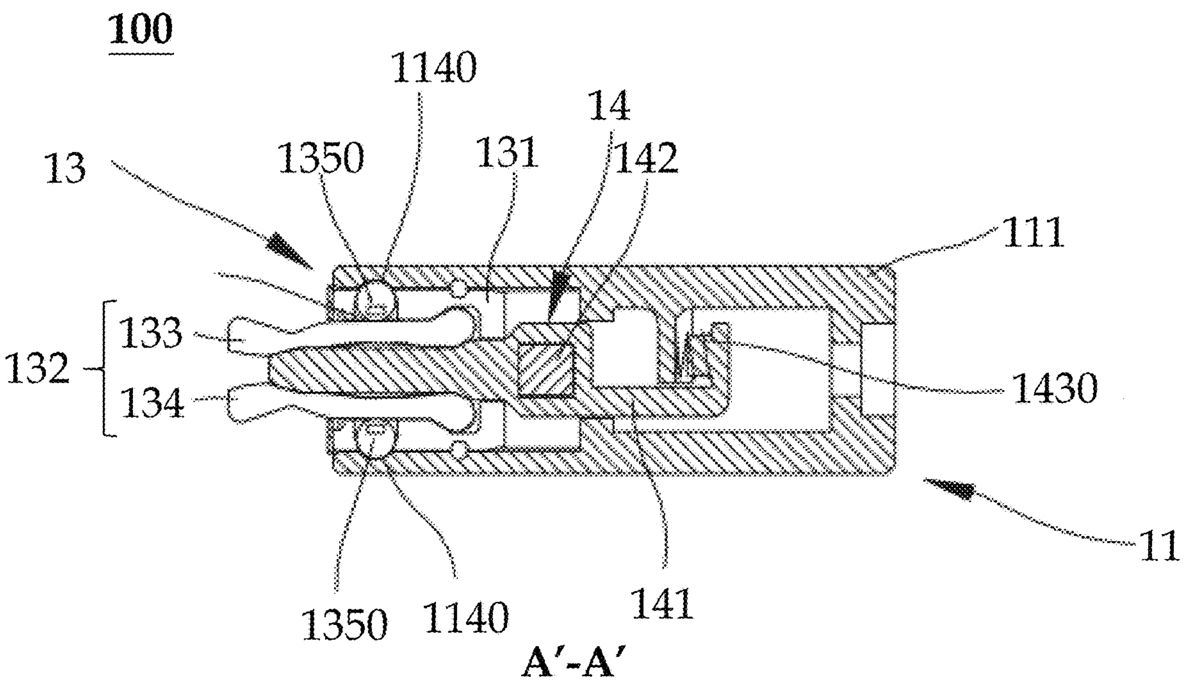

FIGS. 3C to 3F disclose the detail of the working mechanism of the elements of the lock 100 when the lock 100 is changed from the unlocked state to the locked state. FIGS. 3C and 3D disclose the lock 100 in a normal state (i.e., an unlocked state). When the lock 100 is in the normal/unlocked state, the lock cylinder 12 and the lock head 13 are in the unlocked state. In contrast, FIGS. 3E and 3F disclose the lock 100 in a locked state. When the lock 100 is in the locked state, the lock head 13 and the lock cylinder 12 are in the locked state. FIG. 3D is the cross section view along A-A in FIG. 3C, and FIG. 3F is the cross section view along A'-A' in FIG. 3E. It is also important to note that the engagement element 132 is in its first state when the lock 100 is in the locked state, and the engagement element 132 is in its second state when the lock 100 is in the unlocked state.

Here, FIG. 3C shows that the lock head 13 and the lock cylinder 12 being spaced apart for a distance vertically. There is a distance H between the lower edge of the engagement element 132 (i.e., the lock fingers 133, 134) and the bottom 1112. The distance H is no more than 2.6 millimeters for ergonomic purposes. In some embodiments, the stabilizing element 14 is disposed within the lock body 11 for controlling the lock head 13 to be secured with or readily removable from the lock body 11. It also controls the engagement element 132 to be in the second (unlocked) state or the first (locked) state. As FIG. 3C discloses, when the lock head 13 is in the unlocked state, one end of the lock rod 121, which is away from the lock head 13, extends from the center of the lock cylinder 12 and out of the lock body 11. The two ends of the linkage 142 respectively couple to a front end of the lock rod 121, which is proximate to the lock head 13, and the body of the movable latch 141. It is important to note that the foregoing does not intend to limit the connection between the elements to be direct. Indirect connection is also within the scope of this disclosure, meaning there can be other components therebetween. In essence, one can say that the components are operably connected. As FIGS. 3C and 3D disclose, the lock fingers 133, 134 are folded inwardly (not expanded), and the two positioning balls 1350 are retracted within the through hole 136 of the lock head body 131. Therefore, the positioning balls 1350 do not occupy the insertion groove 1140. In addition, the movable latch 141 is maintained in a "second position" (i.e., a retracted position) by the pushing force from the elastic member 1430, and a pin portion of the movable latch 141 is maintained in a space between the lock fingers 133, 134. The opposite of the second position is the first position (i.e., an "extending position"). The latch 141 is proximate to the interface/slot of the electronic device in the first position. Further details of the first position will be discussed in later paragraphs. In the present embodiment, the elastic member 143 is a spring 1430 and it is at one end of the movable latch 141 opposite to the pin portion, and the spring is in an untensioned state (as FIG. 3D discloses).

In some embodiments, the lock head 13 further includes fixing elements 1370 at its sidewall, and grooves 137 are set at inner walls of the housing 111. When the lock head 13 is inserted into the lock body 11 but not in the locked state, the fixing element 1370 occupies the groove 137 so as to create friction therebetween. As a result, the lock head body 131 is captured by the lock body 11, ready to be engaged with the electronic device, as FIG. 3D discloses. Without such, the lock head 13 may be inadvertently released from the lock body 11, resulting in missing of the lock head during the unlocked state. In certain embodiments, regardless of whether the lock 100 is in the locked state or the unlocked state, the fixing element is designed such that the lock head 13 does not easily escape from the lock body 11. The fixing element 1370 may be a rubber ring. Still, the material of the fixing element 1370 includes, but is not limited to, elastic materials or hard materials, and the shape of the fixing element 1370 includes, but is not limited to, a ring, protrusions, and blocks. In some embodiments, the fixing element 1370 may be an adhesion element, e.g., glue, meant to permanently attach the lock head 13 to the lock body 11.

FIGS. 3E to 3F disclose the lock 100 in the locked state. If a user wants to switch the lock 100 from the unlocked state to the locked state, he/she can push the lock rod 121 into the lock body 11, and the stabilizing element 14 will change the lock head 13 into the locked state. Essentially, the lock rod 121 can be considered as a switch adapted to hold the lock fingers in the first state and to release the lock fingers from the first state. Specifically, when the lock rod 121 is pushed, the lock cylinder 12 secures and maintains the lock rod 121 in a locked state. Also, the linkage 142 is pushed by the lock rod 121, and the movable latch 141 is moved to a first position (i.e., an "extending position") (as FIGS. 3E and 3F disclose). The protruding movable latch 141 causes the lock fingers 133, 134 to outwardly deploy so the lock is at the locked state. In other words, the lock fingers 133, 134 shift in horizontal direction so as to enter the first state. Contacting surface between the expanded lock fingers 133, 134 and the slot 16 increases, thus the friction therebetween. As a result, the lock 100 is secured to the electronic device. Meanwhile, the positioning balls 1350 are synchronously pushed outwardly by the two lock fingers 133, 134 and partially extend from the lock head body 131. Consequently, the positioning balls 1350 mate with the insertion groove 1140 on the inner surface of the hosing 111 and are embedded therein. In other word, the positioning balls 1350 and the insertion groove 1140 are engaged. Therefore, the lock head 13 is secured within the lock body 11. It is worth to note that when the lock 100 is in the locked state, the spring 1430 is in a tensioned state (as FIG. 3F discloses), as opposed to the unlocked state of the lock 100.

When the user wants to switch the lock head 13 back to the unlocked state, he/she can use the key K (See FIG. 2A) to unlock and release the lock rod 121 by the lock cylinder 121. Further, the movable latch 141 will return to the retracted position from the extending position due to the restoring force changing the spring 1430 from the tensioned state to the untensioned state. The lock fingers 133, 134 synchronously collapse inwardly to the second state (unlocked state) due to the diminishment of support of the movable latch 141. Also, the positioning balls 1350 retract into the through hole 136 of the lock head body 131 (as FIG. 3D discloses). When the movable latch 141 moves back to the retracted position, the lock rod 121 can be synchronously push outwardly by the linkage 142.

Figure 4:
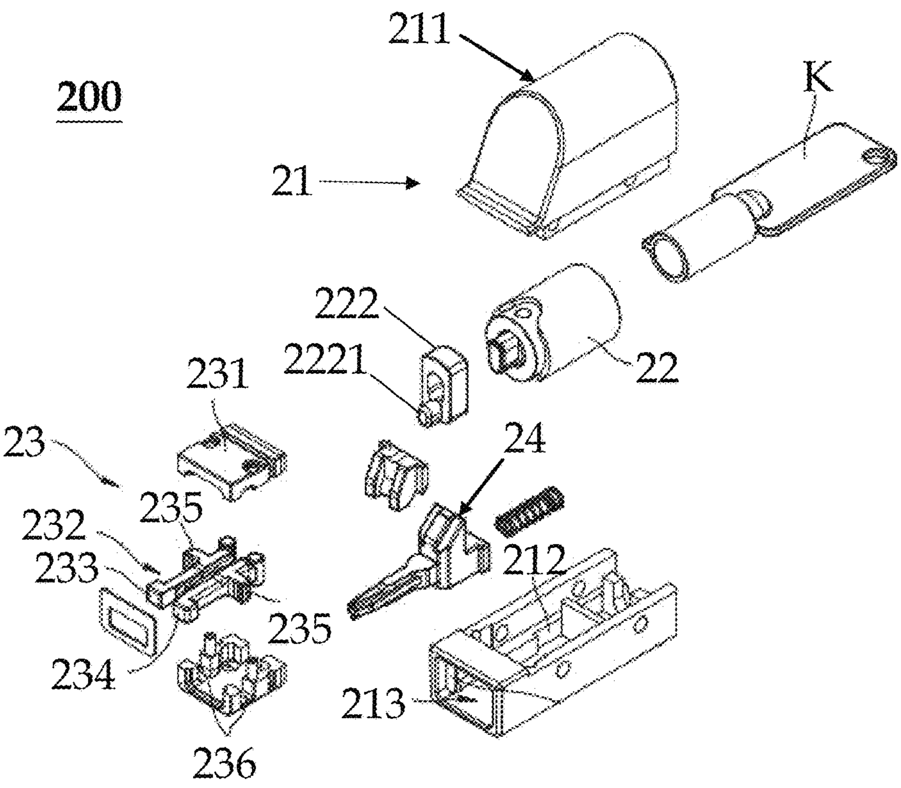
FIG. 4 discloses a second embodiment of the lock according to the present disclosure.

FIG. 4 discloses the second embodiment (i.e., a lock 200) of the present disclosure. The lock 200 in the second embodiment is a key lock operated by a key K. It is important to note that most components of the lock 200 are similar to those of the lock 100 in the previous descriptions. Briefly, the lock 200 includes the lock body 21 and the lock head 23. The lock head 23 includes the lock head body 231, which has through holes 236 on its side. The lock head 23 also includes the engagement element 232, which has two lock fingers 233, 234. The lock body includes a housing 211, a lock cylinder 22, a space 212 for receiving the stabilizing element 24, and an opening 213 at the front end of the housing 211. The major differences between the embodiments of the lock 200 and the lock 100 are the lock cylinder, the stabilizing element and the positioning element. We will introduce more details about such differences in the following description.

As FIG. 4 discloses, the lock cylinder 22 of the lock 200 does not include a lock rod but rather have an eccentric cam 222. Therefore, the connection and the working mechanism between the stabilizing element 24 and lock cylinder 22 of the lock 200 are different from that of the lock 100. Further, FIGS. 5A to 5E disclose more detail about the working mechanism of the locked state and the unlocked state of the lock 200.

Figure 5A:
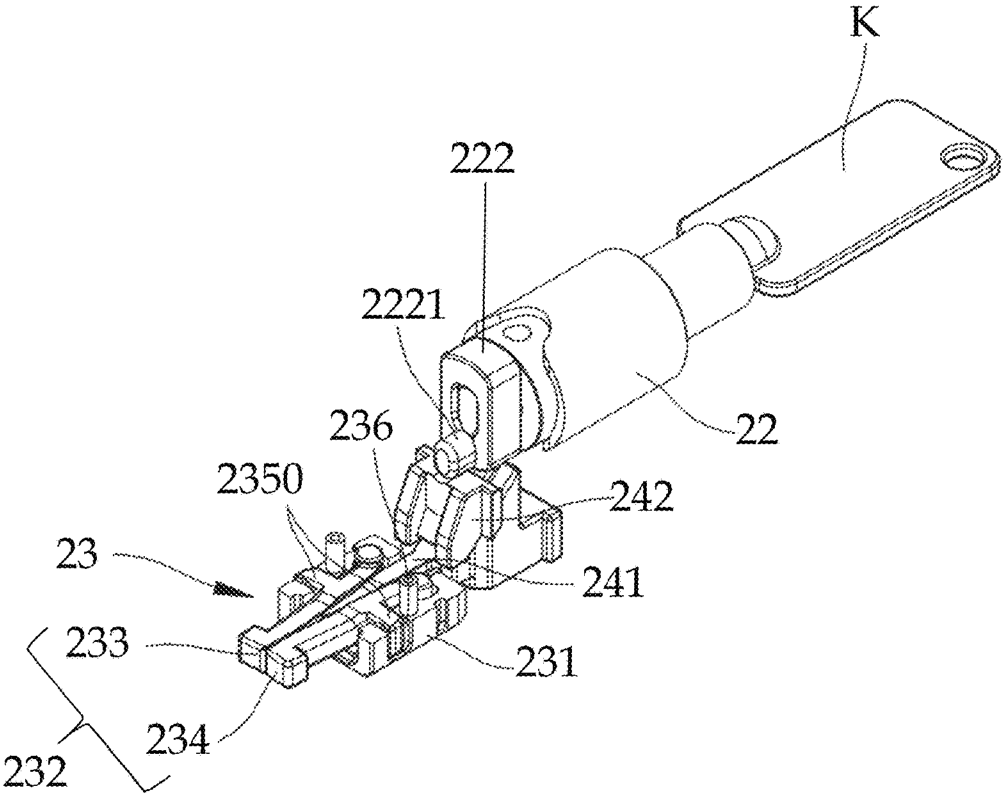
FIGS. 5A to 5F also disclose the second embodiment of the lock according to the present disclosure.
Figure 5B:
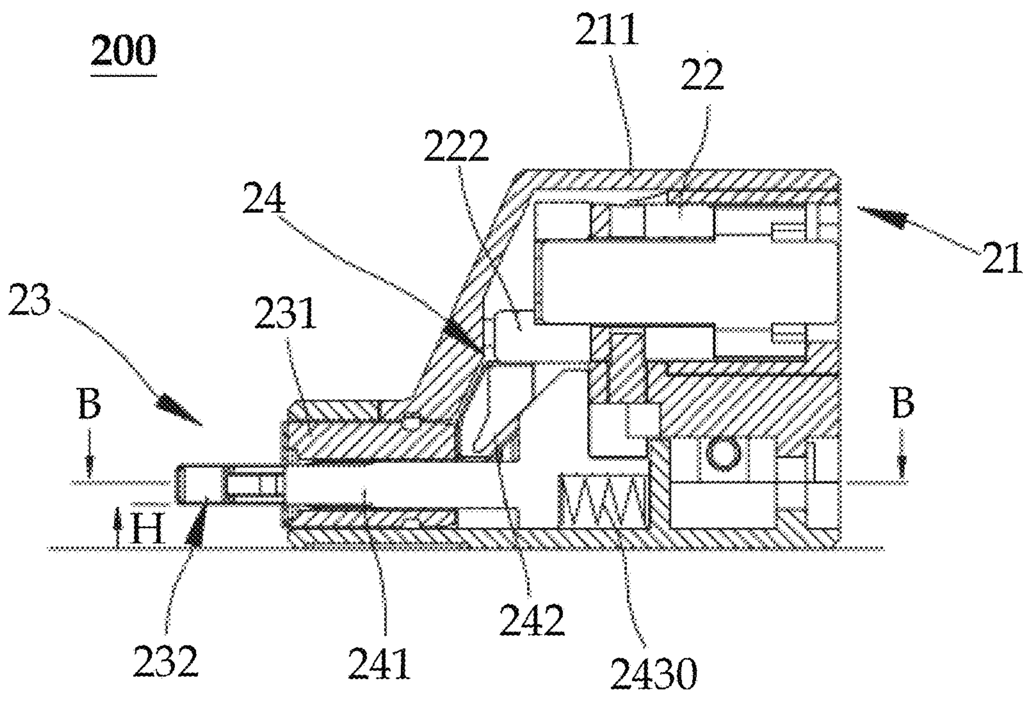
Figure 5C:
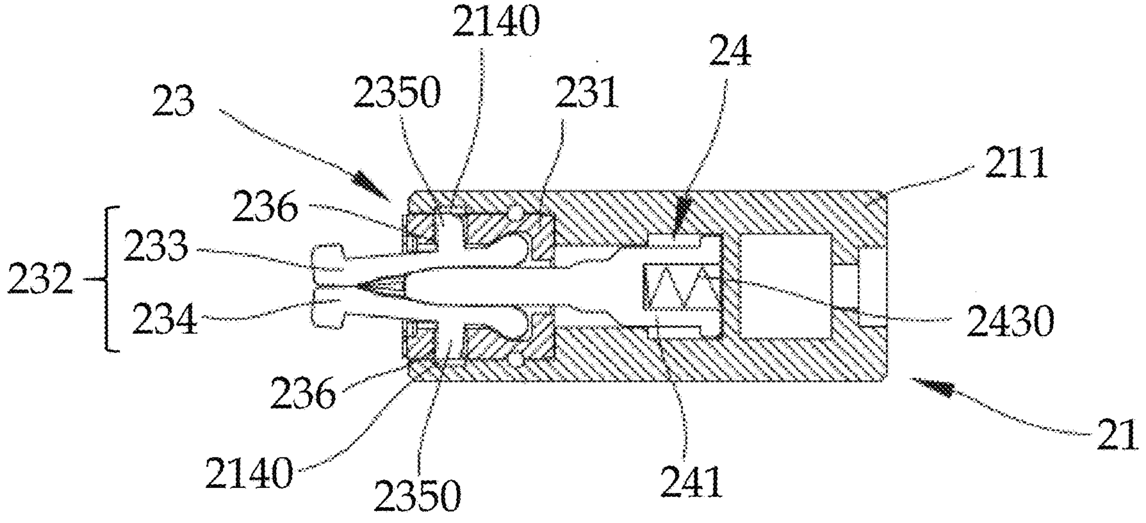

In some embodiments, changing the lock 200 from the locked state to the unlocked state or vice versa is achieved through controlling the lock cylinder 22 by the key K (as FIGS. 5A to 5E disclose). As FIG. 5A discloses, the eccentric cam 222 includes a protrusion 2221 on one end, and the protrusion 2221 points toward to the front side of the lock body. As FIGS. 5A and 5B disclose, when the lock 200 is at the unlocked state, the eccentric cam 222 maintains in a vertical posture, and the protrusion on the eccentric cam 222 is at a lower position, i.e., closer to the bottom of the lock 200. As such, the eccentric cam 222 pushes the linkage 242 down, and the movable latch 241 (stabilizing element) can synchronously move backwardly to a second position (i.e., a "retracted position") by the linkage 242. FIG. 5C is a cross-section view along B-B in FIG. 5B, and FIG. 5F is a cross-section view along B'-B' in FIG. 5E. When the movable latch 241 is at the retracted position, the spring 2430 is compressed/tensioned. In addition, the first engaging members/positioning element in the present embodiment is a protrusion 2350 extending from the body of the lock fingers 233, 234. When the lock head 23 is at the unlocked state, the lock fingers 233, 234 collapse inwardly, and the protrusions 2350 are retracted within the through hole 236 of the lock head body 231 and does not occupy the insertion groove 2140 (second engaging member).

Figure 5D:
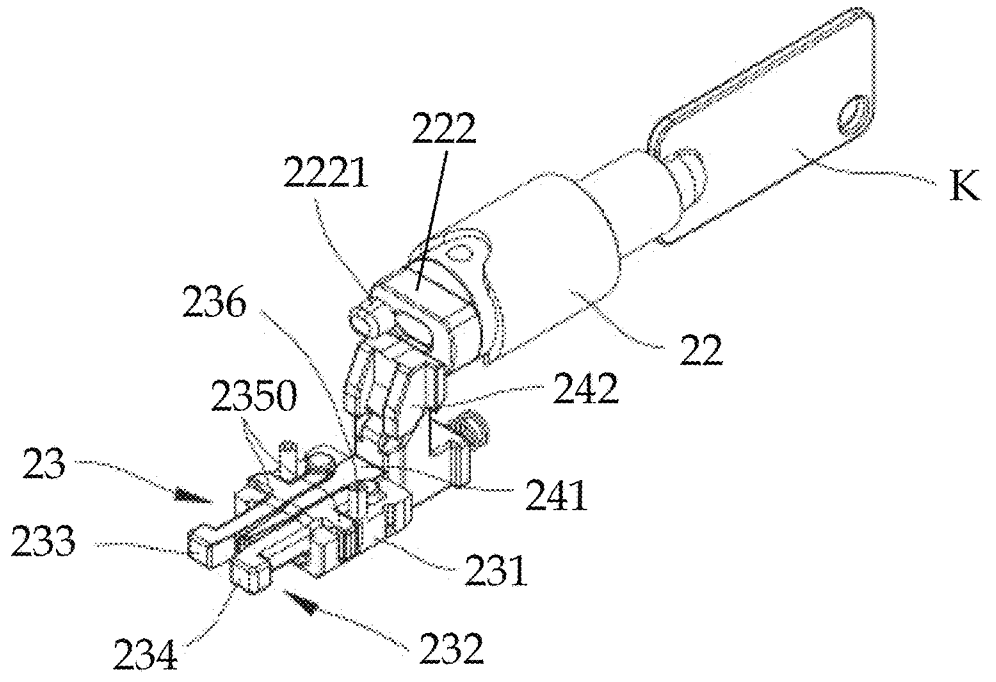
Figure 5E:
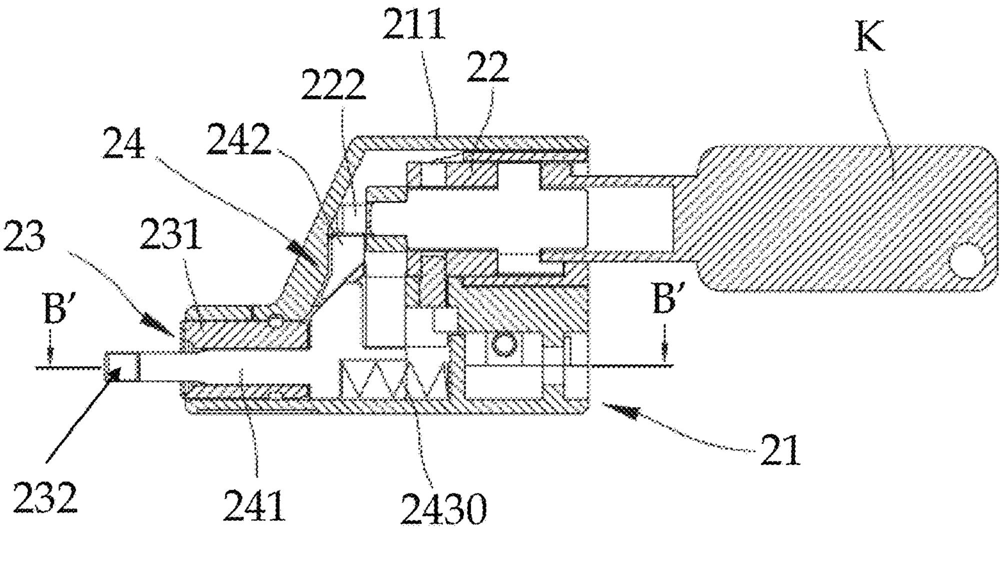
Figure 5F:
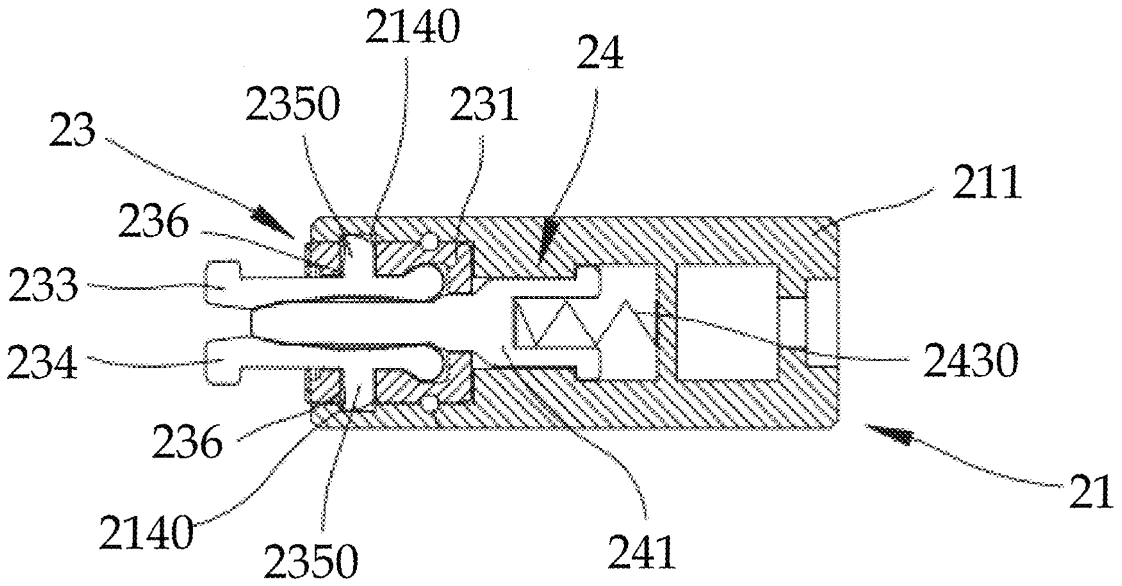

With reference to FIGS. 5D to 5F, when the user uses the key K to change the lock 200 into a locked state through the lock cylinder 22, the eccentric cam 222 is rotated and maintained in a horizontal state. As such, the protrusion 2221 thereon is at a higher position vertically. Therefore, the linkage 242 can be synchronously moved up by a pushing force from the movable latch 241. Specifically, the untensioning force from the spring 2430 moves the movable latch 241 forward so as to create the pushing force against the linkage 242. When the lock 200 is changed to the locked state, the linkage 242 can elevate to a space that is previously occupied by the protrusion 2221 of the eccentric cam 222 in the unlocked state. Therefore, there is room for the movable latch 241 to move forwardly to the first position (i.e., a "protruding position") (as FIGS. 5D to 5F disclose). Further, the lock fingers 233, 234 are outwardly deployed into the locked state in response to the extending movement of the latch 241. Thus, the lock fingers 233, 234 are secured to the security slot of the electronic device. Correspondingly, the protrusion 2350 thereon passes through the through hole 236 and extends into the insertion groove 2140 on the inner wall surface of the housing 211 for engagement. In other words, the protrusion 2350 is engaged with the insertion groove 2140. As such, the lock head 23 is secured to the lock body 21 when the lock 200 is in the locked state (i.e., when the lock fingers 233, 234 are in the first state).

Figure 6A:
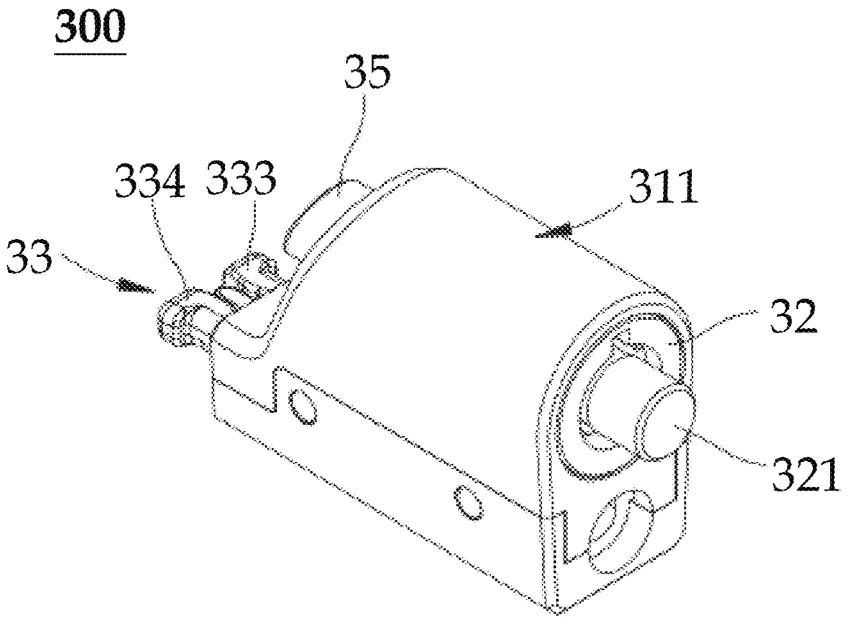
FIGS. 6A to 6I disclose a third embodiment of the lock according to the present disclosure.
Figure 6B:
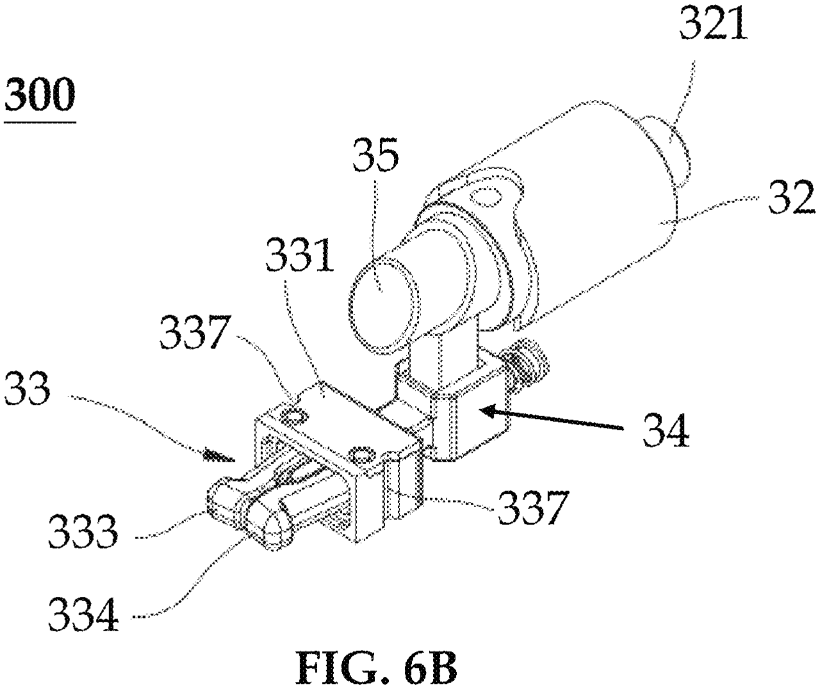
Figure 6C:
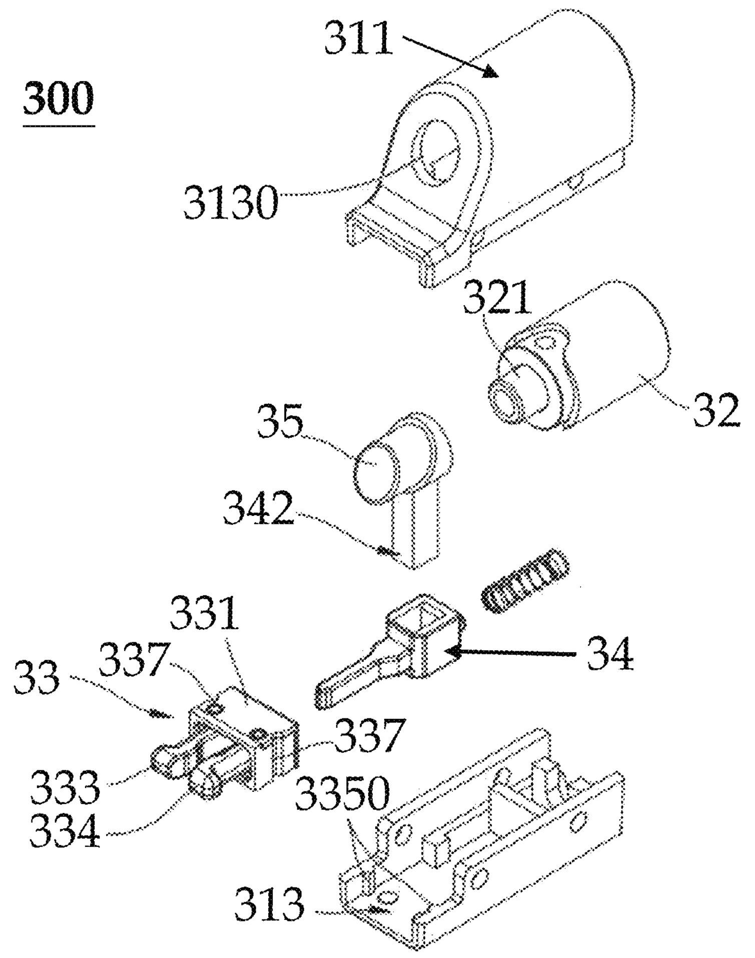

FIGS. 6A to 6C disclose the third embodiment (i.e., a lock 300) of the present disclosure. It is important to note that most components of the lock 300 are similar to those of the locks 100, 200 in the previous descriptions. Briefly, the lock 300 includes a lock boy 31 and a lock head 33. The lock head 33 includes two lock fingers 333, 334, a lock head body 331, and a groove 337 on the surface of the lock head body 331. The lock body 31 includes a lock cylinder 32, a housing 311, and a stabilizing element 34 and a moveable latch 341 thereof. It is worth to know that, altering the lock head 33 between its locked state or unlocked state does not involve the key K but the lock cylinder 32 and relevant components thereof. In the following description, we will disclose more details about the difference of the lock 300 comparing with the previous embodiments (i.e., the locks 100, 200).

As FIG. 6C discloses, the lock body 31 further includes another opening 3130 configured on the upper front portion of the housing 311. The cylinder 32 includes a lock rod 321 passing through it. There is an actuator, e.g., a button 35, that is configured at one end of the linkage 342, and the button 35 is used to engage with one end of the lock rod 321 directly or indirectly. The design of the lock head 33 is different from those in the previous embodiments. The lock head 33 of the lock 300 is a pre-installed type, meaning it's not intended to be removed or switched by users. In other words, a desired lock head 33 will be selected and installed into the lock body before the housing 311 is assembled. After the housing 311 is assembled, the lock head 33 cannot be removed from the lock 300. Hence, the lock fingers 333, 334 does not include any positioning element, and there is a first engaging member, i.e., groove 337, on the sidewall of the lock head body 331. The hosing 311 includes at least one second engaging member, i.e., protrusion 3350, on the inner wall close to the opening 313. Because the shape of the protrusion 3350 and the groove 337 are complementary, the lock head 33 is secured to the lock body 31 and cannot be removed.

Figure 6D:
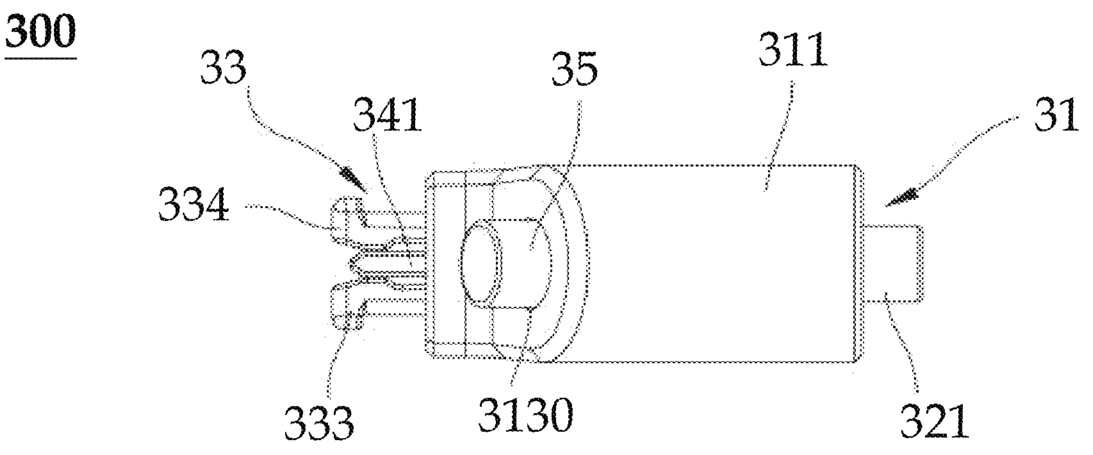

The following description will disclose more detail about the working mechanism of the lock 300 between its locked state and unlocked state. When the lock 300 is in a normal state (i.e., when idled and not being coupled to the slot 36), the lock 300 is in its locked state (as FIG. 6D to 6E disclose). More specifically, a pushing force from the spring 3430 pushes the moveable latch 341 forwardly and maintains it in a first position (i.e., a "protruding position"). In addition, the linkage 342 synchronously move forwardly, and the button 35 protrudes from the front opening 3130 of the housing 311. The lock fingers 333, 334 are also deployed outwardly due to the position of the moveable latch 341.

Figure 6E:
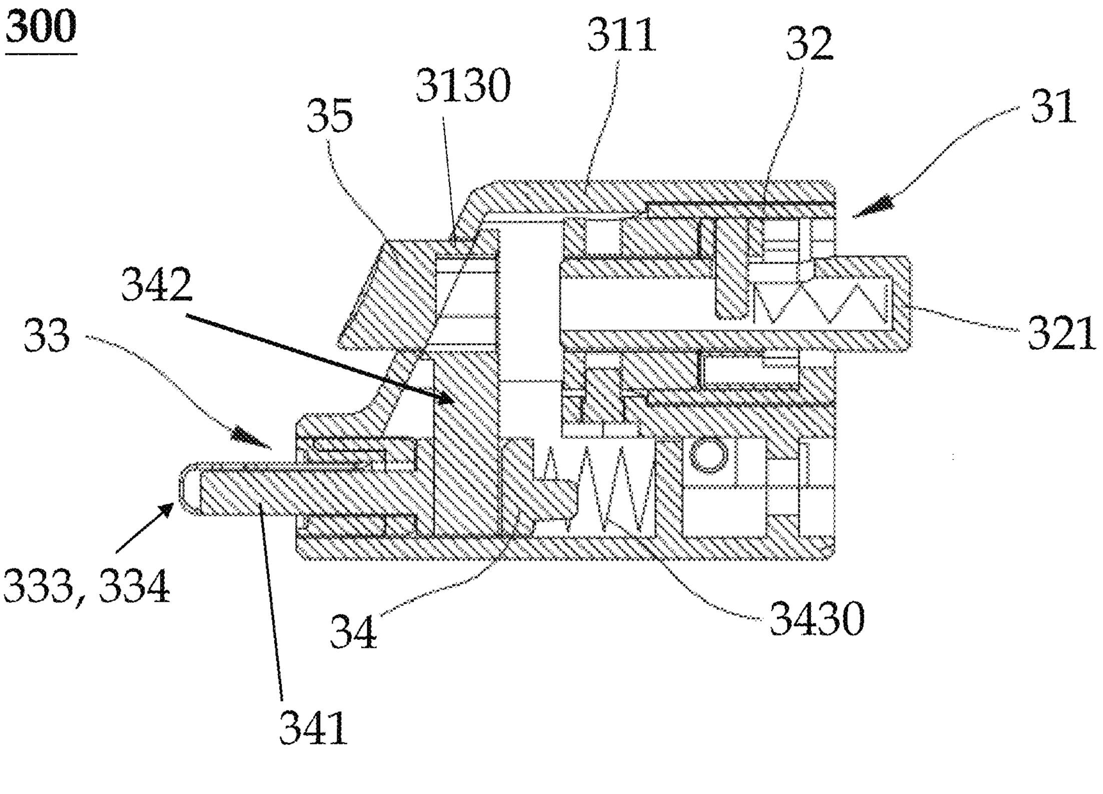
Figure 6F:
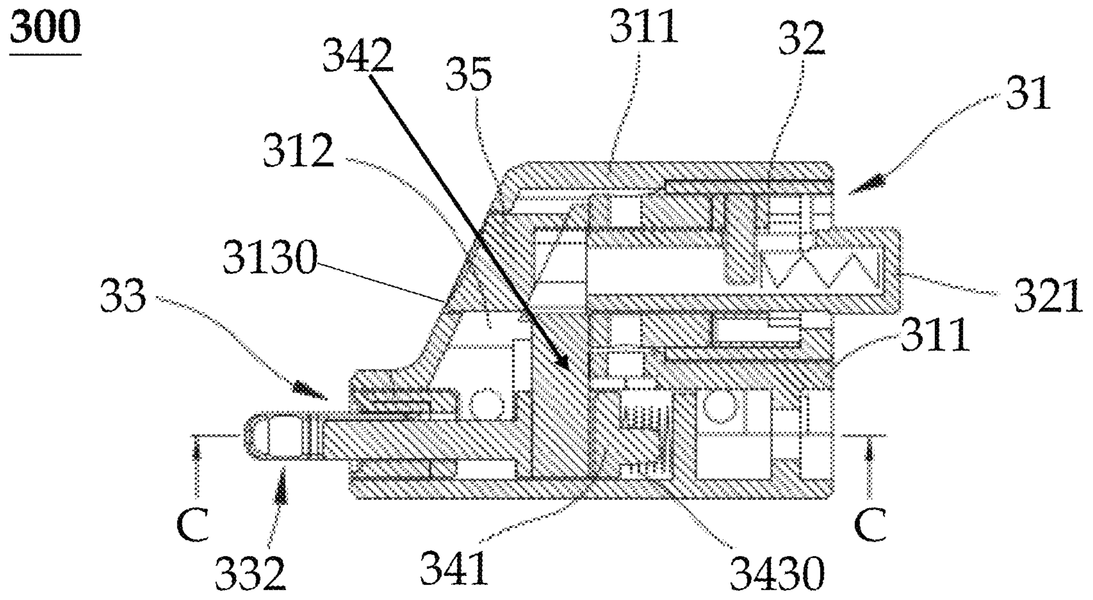
Figure 6G:
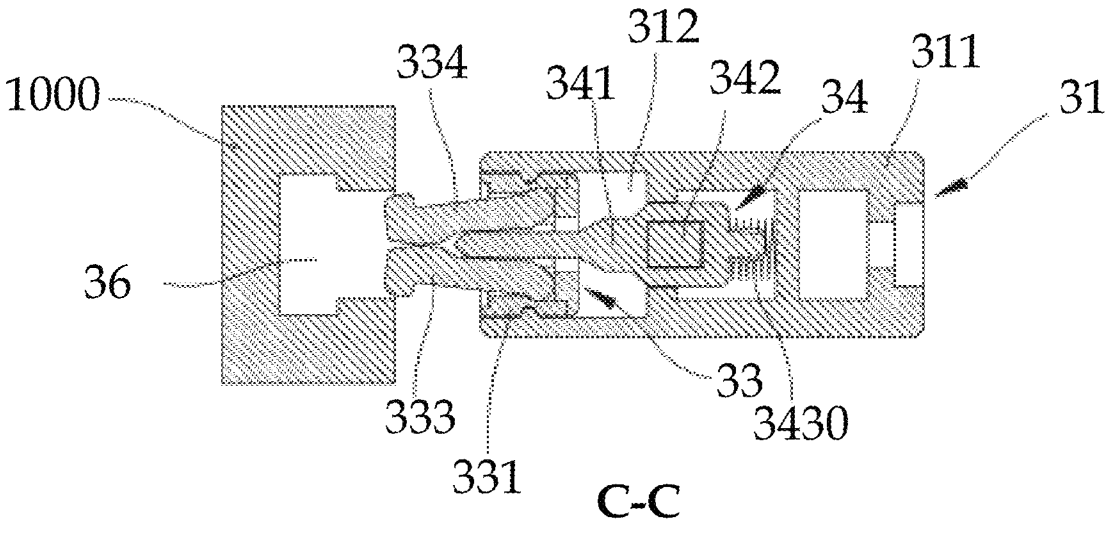
Figure 6H:
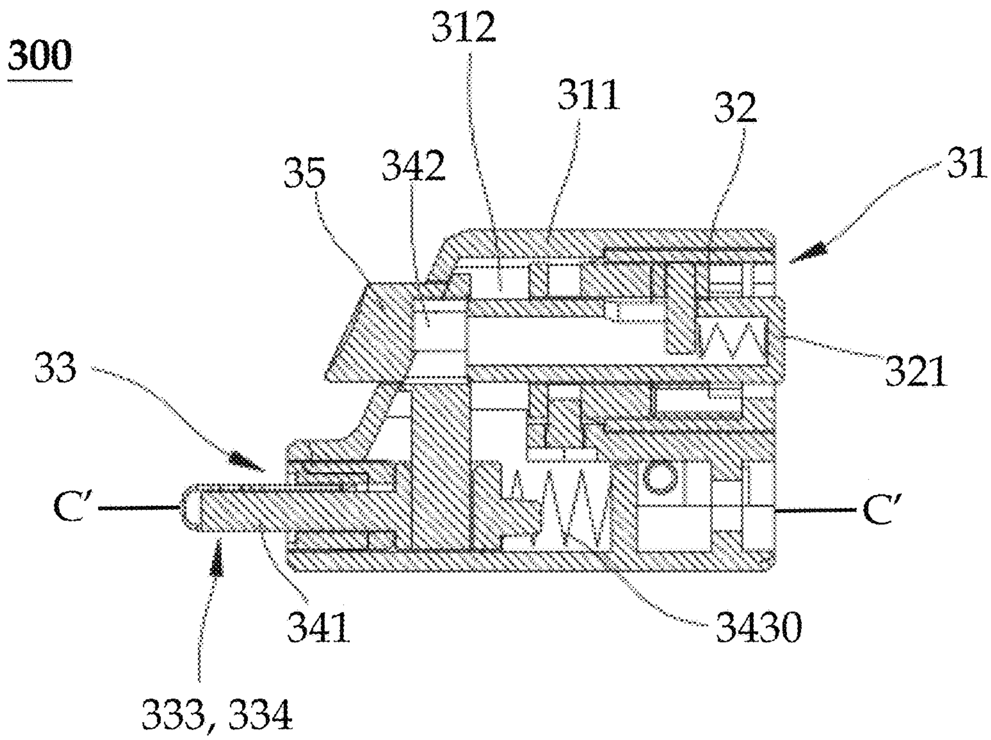
Figure 6I:
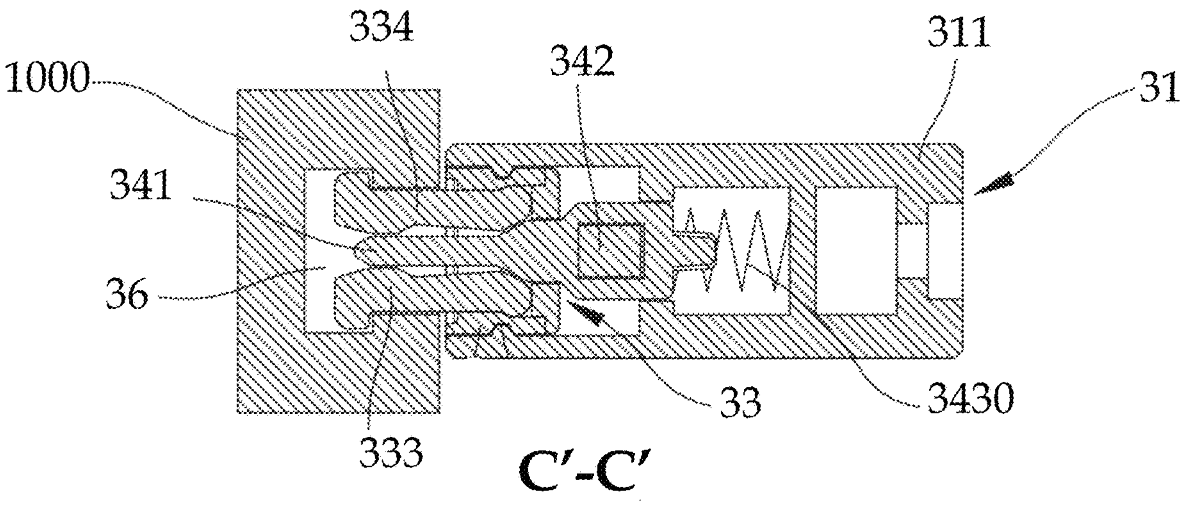

FIG. 6G is a cross-section view along C-C in FIG. 6F, and FIG. 6I is a cross-section view along C'-C' in FIG. 6H. FIGS. 6F and 6G disclose an intermediate state of the lock 300 when a user wants to install the lock fingers 333, 334 into the lock slot 36. As stated, the lock fingers 333, 334 are deployed outwardly in the normal state. Therefore, before installing the lock fingers 333, 334 into the slot 36, the user needs to push the button 35 into the space 312 of the housing 311 to move the linkage 342 backwardly, and the moveable latch 341 can synchronously move to the second position (i.e., a "retracted position"). Further, the lock fingers 333, 334 are folded inwardly (second state), and the spring 3430 is compressed/tensioned. Therefore, the lock fingers 333, 334 can be inserted into the slot 36.

After the lock fingers 333, 334 are inserted into the slot 36, the user can release the button 35. An untensioning force from the spring 3430 then pushes the moveable latch 341 forwardly and maintains it in its first position (i.e., the "protruding position"). Consequently, the lock fingers 333, 334 are deployed outwardly so as to be captured by the slot 36 and secure the lock head 33 to the slot 36 (as FIG. 6I discloses). The user can then push the lock rod 321 into the lock body 311 to switch the lock cylinder 32 to a locked state. The button 35 can no longer be pushed and the lock fingers 333, 334 are spread outwardly and fixed. As FIG. 6H discloses, when the lock cylinder 32 is in the locked state, space 312 is substantially occupied by the front end of the lock rod 321. Therefore, the button 35 and the linkage 342 cannot move backwardly, and the moveable latch 341 is maintained and secured in the protruding position. The lock 300 is now secured to the slot 36 to prevent theft.

If the user wants to remove the lock 300 from the electronic device, he/she needs to use a key (not shown) to switch the lock cylinder 32 to an unlocked state such that the lock rod 321 can be moved backwardly, as FIG. 6E discloses. Further, the user can change the lock 300 into the intermediate state by pushing the button 35 so as to collapse the lock fingers 333, 334 and remove them from the slot 36.

FIGS. 7A to 7D provide a fourth embodiment (i.e., a lock 400) of the present disclosure. The lock 400 is a key operated lock, which is modified from the third embodiment (the lock 300), and most elements of the lock 400 are similar to those in the lock 300. A key (not shown) is used to control the lock cylinder 42 between a locked state and an unlocked state. The differences between the lock 400 and the lock 300 in their respective embodiments are the lock cylinder 42 and button 45. As FIGS. 7A and 7B disclose, the lock cylinder 42 of the lock 400 does not include a slideable lock rod but a rotatable block 47. Specifically, the rotatable block 47 is, without limitation, an elongated mass, such as a rectangular block. The rotatable block 47 is coupled to a front end of the lock cylinder 42. Corresponding to the operation of the lock cylinder 42, the rotatable block 47 can switch between first and second orientations, which corresponds to the unlocked or locked states of the lock 400 respectively. In addition, a notch 1422 is configured on a back surface of the button 45 and faces the rotatable block 47. In one orientation of the rotatable block 47, the shape of the notch 1422 matches the shape of the rotatable block 47.

Figure 7A:
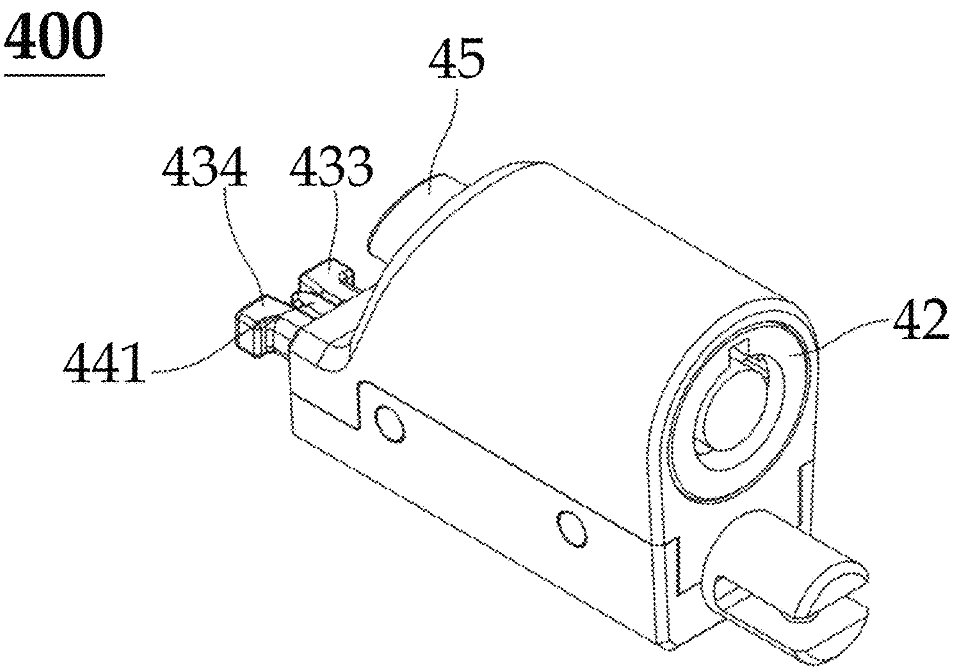
FIGS. 7A to 7D disclose a fourth embodiment of the lock according to the present disclosure.
Figure 7B:
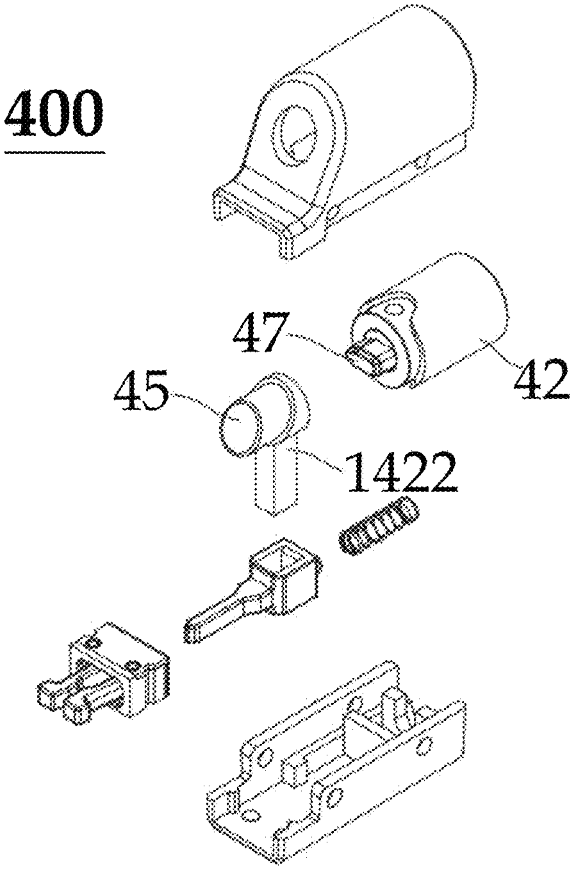
Figure 7C:
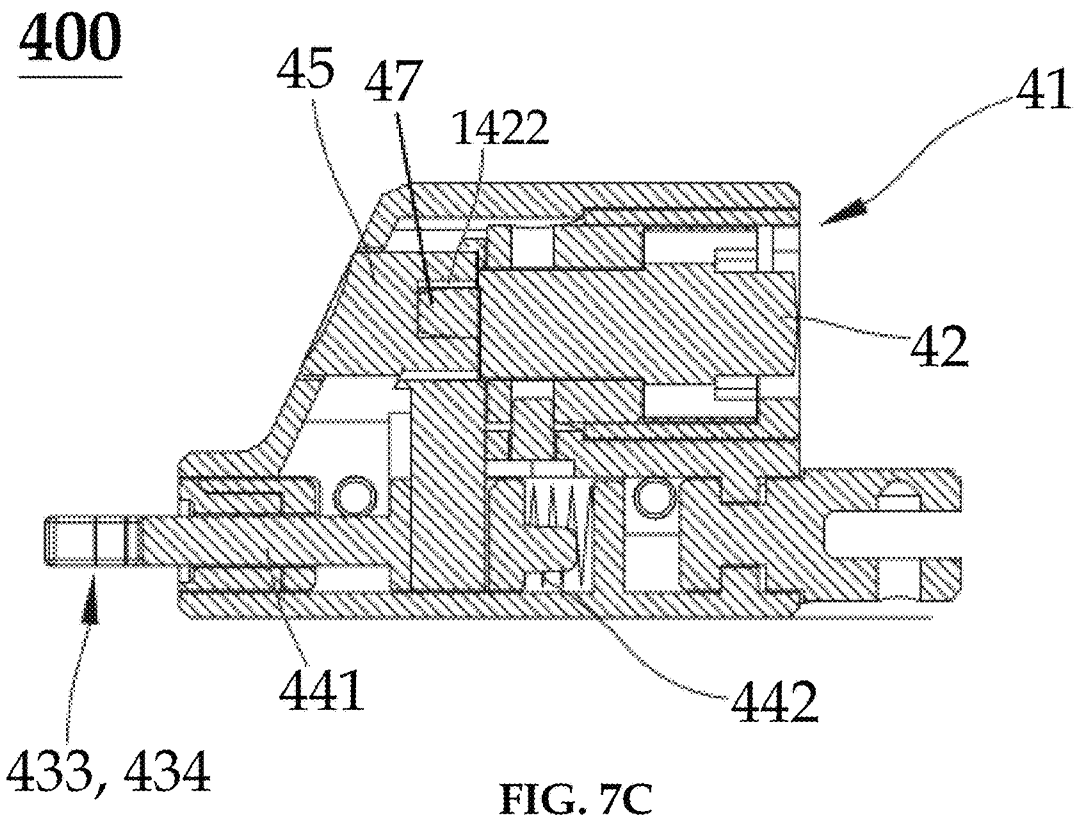
Figure 7D:
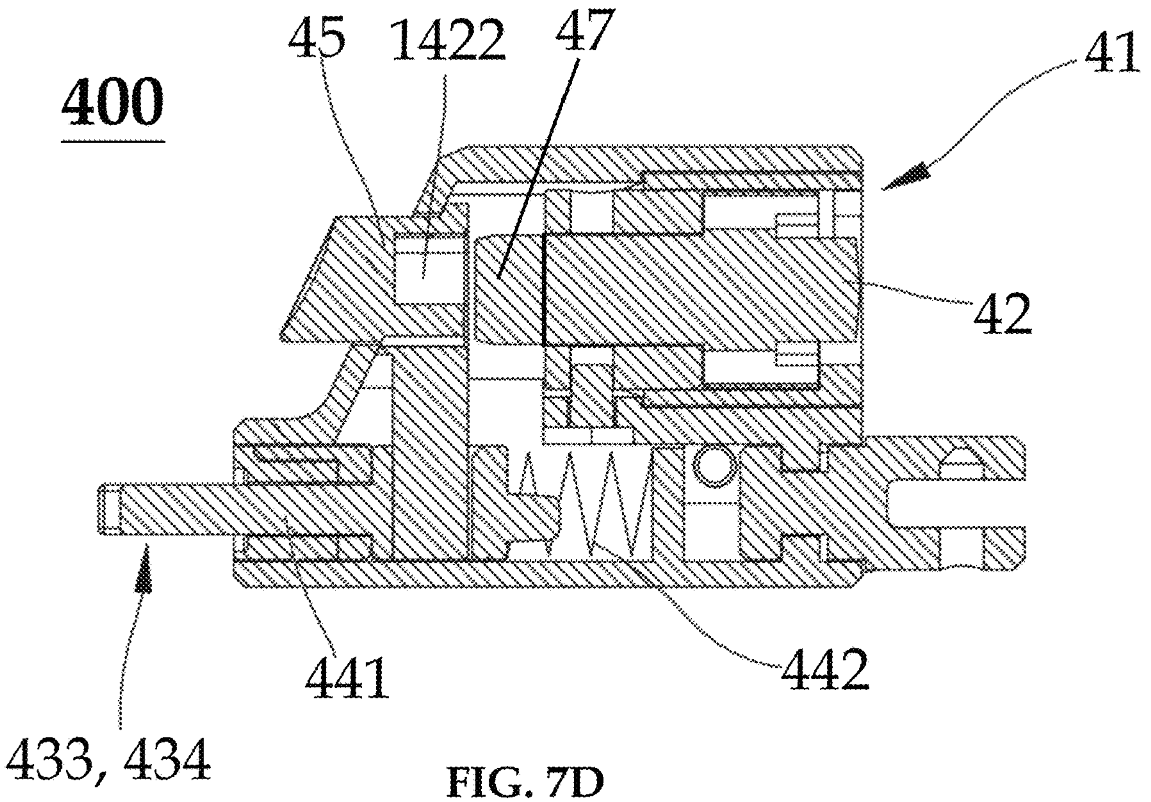

FIG. 7C discloses the lock 400 in the intermediate state where the lock fingers 433, 434 are collapsed and readily removable from the security slot. Meanwhile, the lock cylinder 42 is in the unlocked state. Here, the orientation of the rotatable block 47 makes it compatible with the shape of the notch 1422. In the present embodiment, the orientation of the rotatable block 47 is horizontal when the lock cylinder 42 is in the unlocked state. Therefore, the button 45 can be pushed backwardly as the notch 1422 receives the block 47. The method in which the lock fingers 433, 434 are inserted into the slot of the electronic device is identical with that in the lock 300 relevant embodiments. Briefly, by pushing the button 45, the lock finger 433, 434 collapse inwardly so as to be inserted into the slot. Afterwards, releasing the button 45 allows the lock fingers 433, 434 to synchronously deploy outwardly (as FIG. 7D shows). In other words, the lock fingers 433, 434 shift in horizontal direction so as to engage and increase friction with the internal surface of the slot. As such, the lock 400 is secured to the electronic device.

FIG. 7D depicts that the lock cylinder 42 in the locked state (i.e., when the lock 400 is meant to be secured with the electronic device). Specifically, the orientation of the rotatable block 47 is changed due to the operation of the lock cylinder 42 by a key (not shown). As such, the shape of the rotatable block 47 becomes incompatible with the notch 1422 and the button 45 becomes inoperable. In the present embodiment, the orientation of the block 47 is vertical when the lock cylinder 42 is in the locked state. Because the button 45 cannot move backward, the moveable latch 441 is maintained in the protruding position. Consequently, the lock fingers 433,434 maintain widened, preventing the electronic device to be separable from the lock 400.

If the user wants to remove the lock 400 from the slot of the electronic device, he/she needs to switch the lock cylinder 42 to the unlocked state, i.e., the configuration shown in FIG. 7C. The rotatable block 47 is now back to the horizontal orientation, and the button 45 can be pushed into the lock body 41. Consequently, the lock fingers 433, 434 collapse and can be withdrawn from the slot.

Figure 8A:
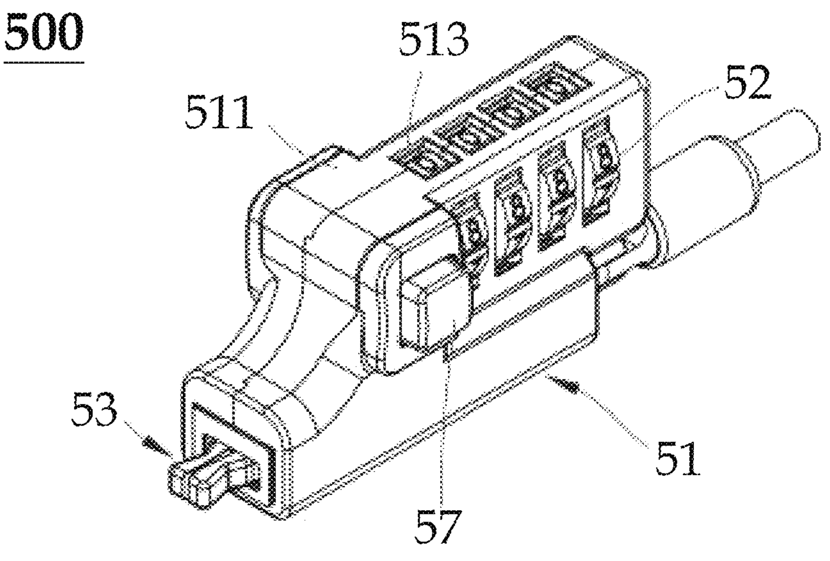
FIGS. 8A to 8B disclose a fifth embodiment of the lock according to the present disclosure.
Figure 8B:
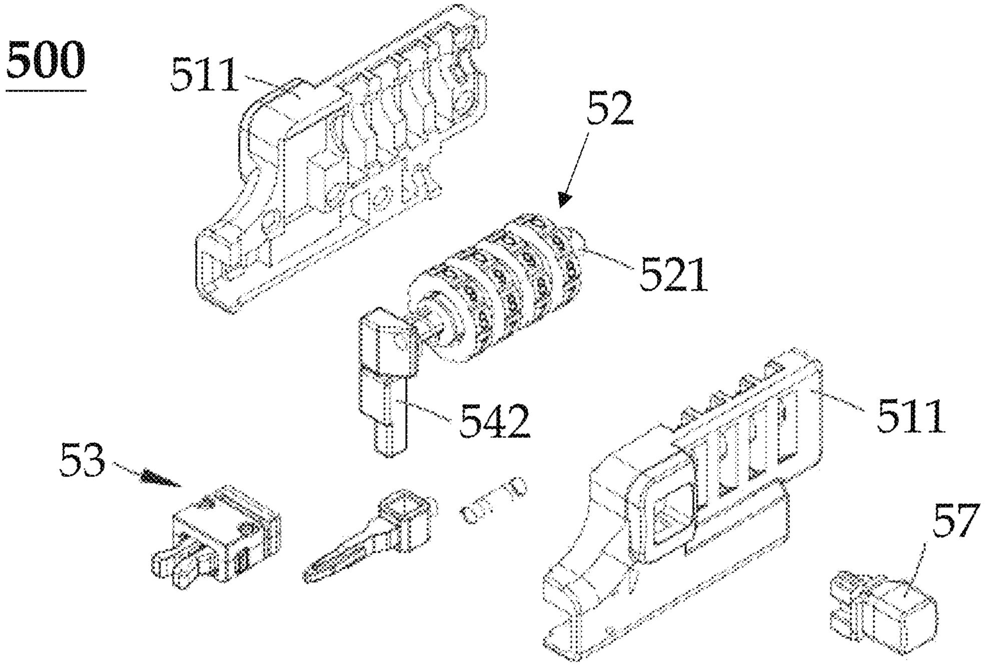

FIGS. 8A to 8B disclose a fifth embodiment (i.e., a lock 500) of the present disclosure. As FIGS. 5A and 5B disclose, the lock 500 is a slide rod type combination lock. The lock head 53 of the lock 500 is identical with that in the lock 200 or lock 100 relevant embodiments. In other words, the lock head 53 is removable from the lock body 51. Further, the major differences between the embodiments of the lock 500 and the previous embodiments (the lock 100, 200, 300 and 400) are the housing, block, lock cylinder and linkage. There are multiple openings 513 at the top and side surface of the housing 511. The top opening 513 is used as an observation window to indicate the present code combination. In addition, a portion of the lock cylinder 52 (i.e., the dial) is revealed from the side opening of the housing 511 for operation purposes. The lock body 51 also includes a pushbutton, i.e., block 57, and the block 57 engages with the top portion of the linkage 542.

Figure 9A:
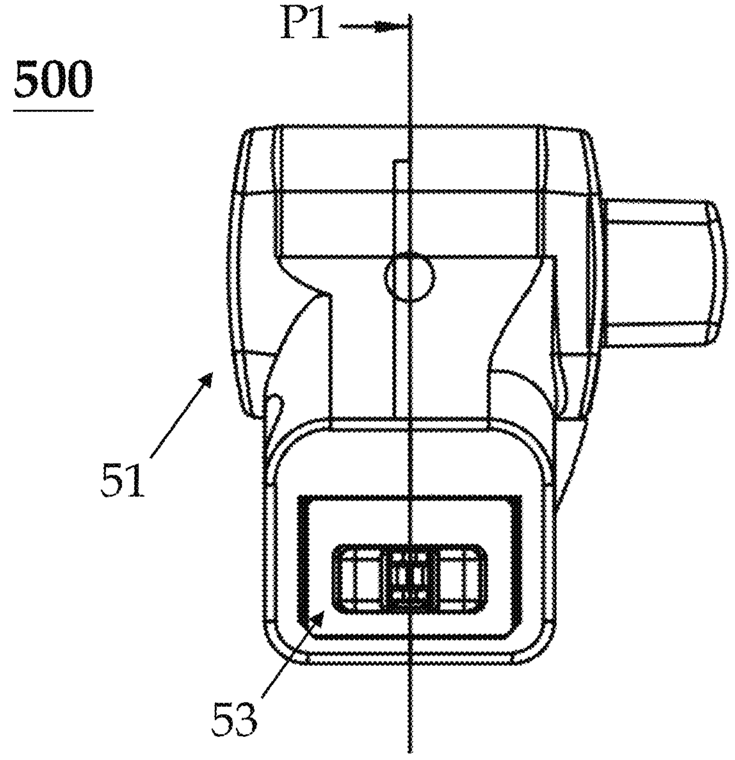
FIGS. 9A to 9C disclose that the fifth embodiment of the lock is in a normal state according to the present disclosure.

For ergonomic purposes, the lock cylinder 52 in the lock 500 of the present disclosure is particularly set at an elevated position of the lock 500. Specifically, FIG. 9A discloses that a plane P1 vertically passing through the lock body 51 and the lock head 53. As FIGS. 9B and 9C disclose, there are another two planes (i.e., plane P2 and P3) horizontally passing through the lock cylinder 52 and the lock head 53 respectively. In other words, the lock head 52 and the lock cylinder 53 are on different planes. In some embodiments, the plane P2 passes through a central longitudinal axis of the lock cylinder 52, and the plane P3 passes through a central longitudinal axis of the lock head 53. As shown in the figures, P2 and P3 are spaced apart. The lock head 52 and the lock cylinder 53 are not coplanar.

Figure 9B:
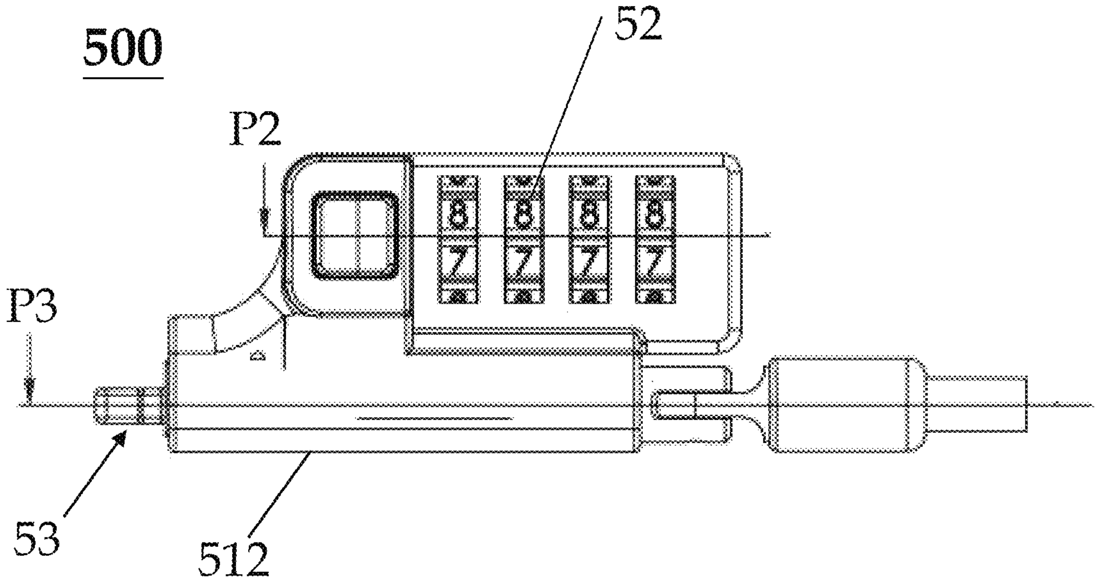
Figure 9C:
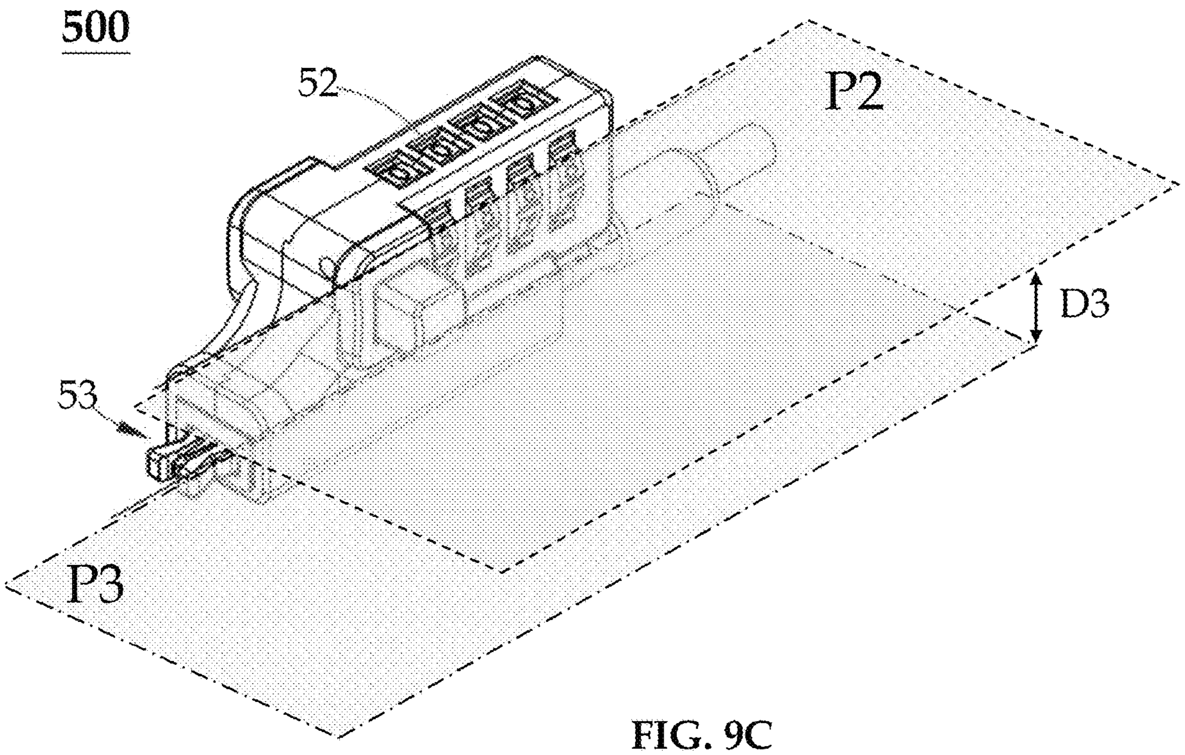

In some embodiments, the plane P2 of the lock cylinder 52 may be parallel with the plane P3 of the lock head 53 (as FIGS. 9B and 9C disclose). Particularly, there is a shortest distance D3 between the plane P2 and the plane P3, and the distance D3 is at least 1 millimeters. Also, the plane P3 is ≤3 millimeters above the bottom surface 512 of the lock body 51. In some embodiments, the plane P2 is not parallel to the plane P3. The plane P3 may be parallel to the bottom surface 512 of the lock body 51, but the plane P2 may not be parallel to the bottom surface 512 of the lock body 51. In other words, the plane P2 and the plane P3 may be crossed at an angle of 0-90 degrees. In other words, the lock cylinder 52 might be tilted for design or ergonomic purposes. Moreover, the double-layered design makes the lock easier to use for reasons already discussed herein (See relevant description for FIGS. 3A-3F relevant embodiments).

Figure 10A:
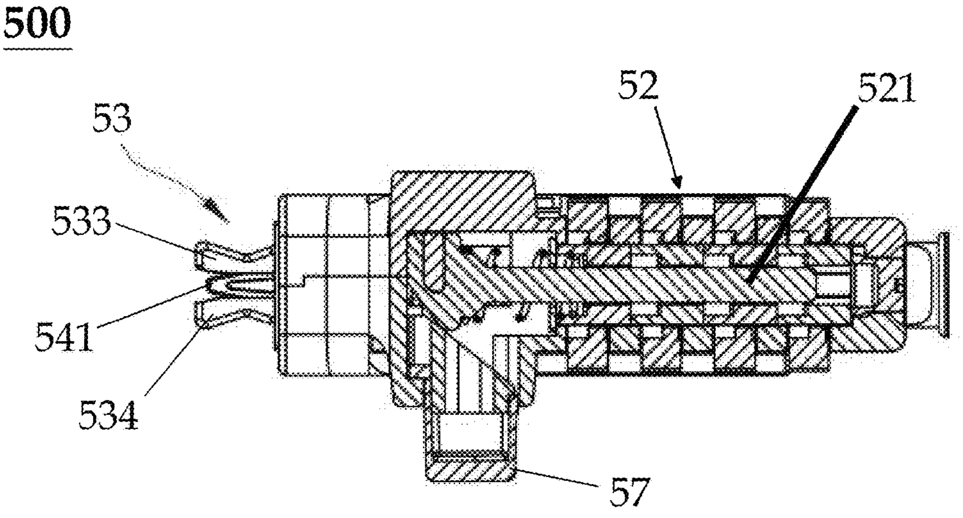
FIGS. 10A to 10D disclose the fifth embodiment of the lock according to the present disclosure.
Figure 10B:
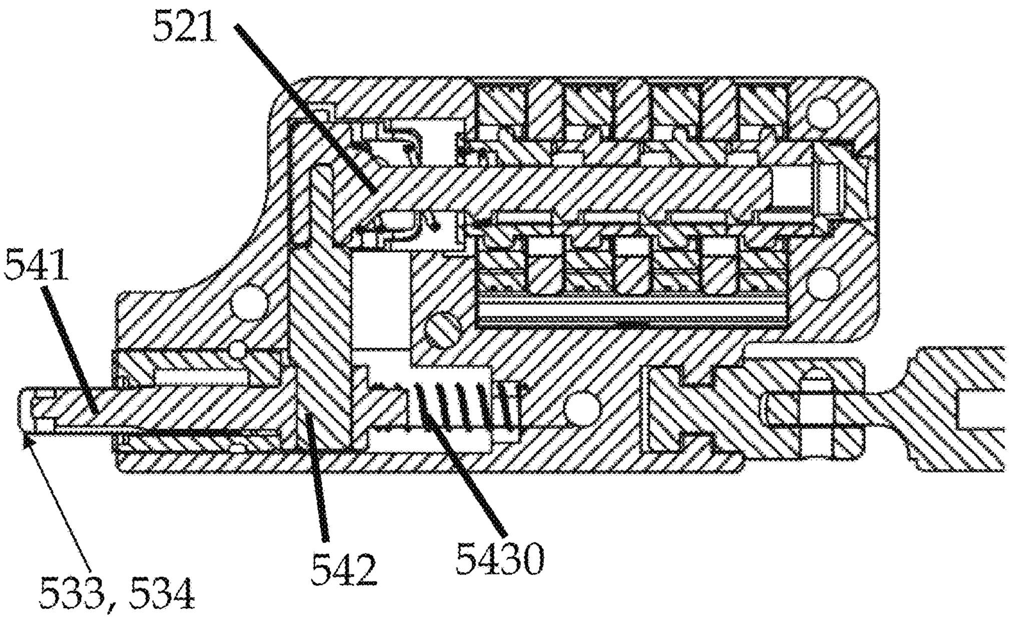

FIGS. 10A and 10B disclose the lock 500 in a normal state. Further, when the lock 500 is in the normal state, the lock cylinder 52 is in an unlocked state, but the lock head 53 is in a locked state. Specifically, when the lock 500 is in the normal state, the lock fingers 533, 534 are deployed outwardly and the block 57 protrudes out from the lock 500 (as FIG. 10A discloses). As FIG. 10B discloses, when the lock 500 is in the unlocked state, the spring 5430 pushes and maintains the moveable latch 541 in a second position (i.e., a "protruding position"), and the lock fingers 533, 534 are pushed outwardly by the moveable latch 541. In addition, the lock rod 521 synchronously moves forward and pushes the block 57 outwardly. With the widespread of the lock fingers 533, 534, the lock can be secured to the electronic device.

Figure 10C:
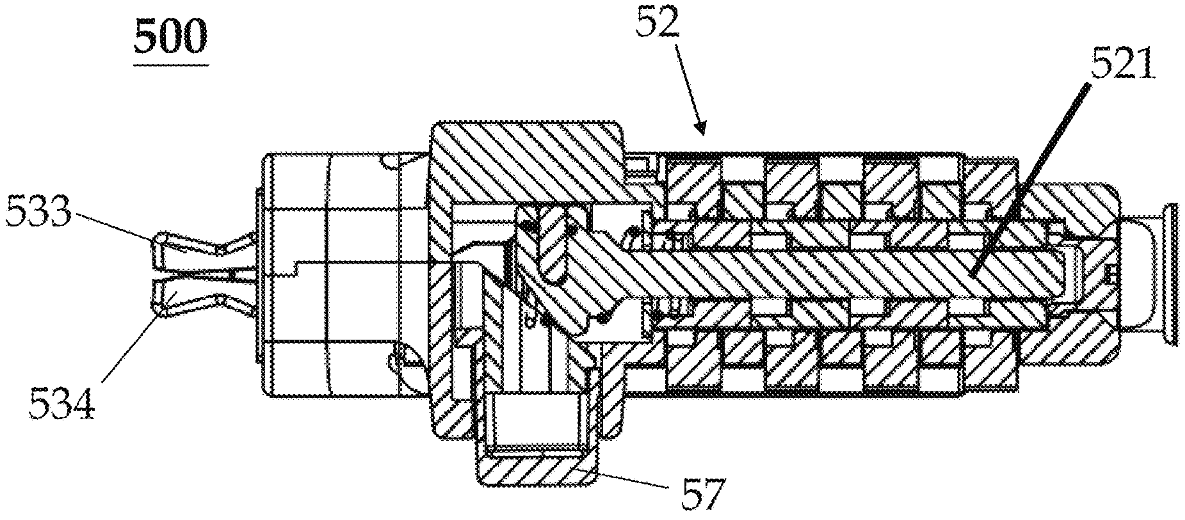
Figure 10D:
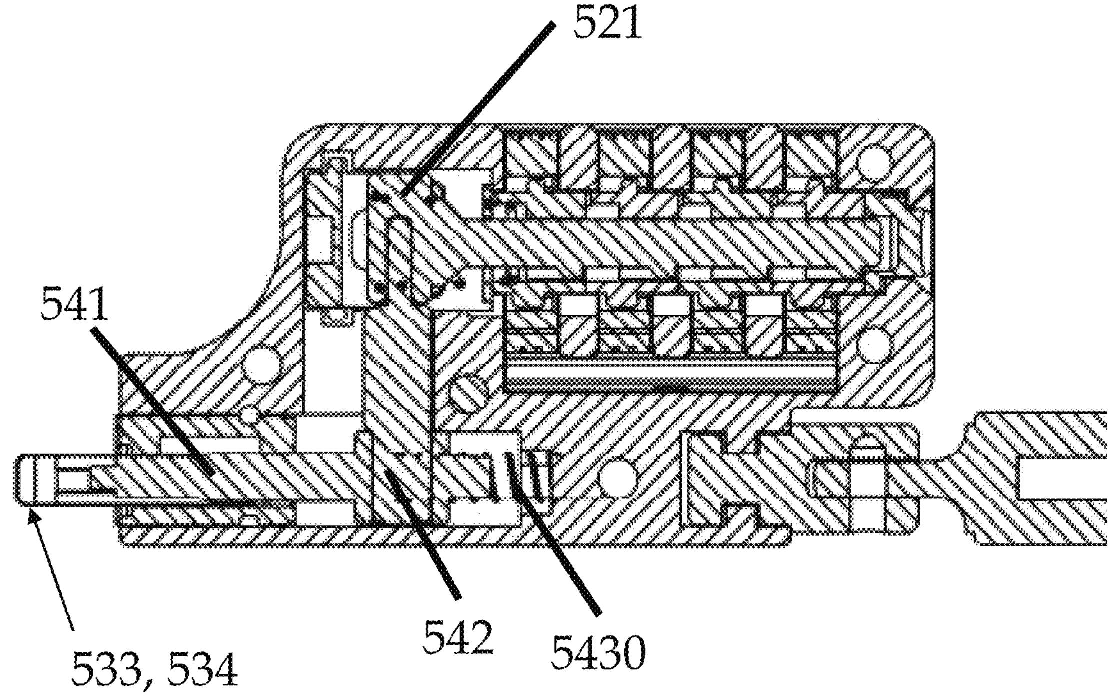

FIGS. 10C and 10D disclose the lock 500 in an intermediate state when a user wants to remove or install the lock fingers 533, 534 in the slot of an electronic device. Specifically, when the lock 500 is in the intermediate state, the lock cylinder 52 is in the unlocked state, meaning the button 57 may be pushed into the lock 500. As such, the latch 541 is pushed inwardly, allowing the lock fingers 533, 534 to retract/collapse (as FIG. 10C discloses). Meanwhile, the linkage 542 and latch 541 are synchronously moved and maintained in a "first position" (i.e., a retracted position) in response to the user's pressing of the button 57. Here the spring 5430 is compressed, and the lock rod 521 moves backwardly into the lock cylinder 52. Now, the user can insert the lock fingers 533, 534 into the slot (not shown in the drawing) of the electronic device while the button 57 is pressed.

When the lock fingers' tip is inserted into the slot, the user can change the lock 500 back to the normal state (as FIGS. 10A and 10B disclose) by releasing the button 57. Further, the user can change the lock 500 into the locked state by changing the code combination at the lock cylinder 52. As such, the lock 500 and lock cylinder 52 are locked, and the lock is securely coupled to the electronic device. The relevant positions of each element of the lock 500 are similar to those in FIGS. 10A and 10B when the lock 500 is in the locked state. The only difference is that the position of the lock rod 521 is secured such that the button 57 cannot be pushed. As such, the lock fingers 533, 534 cannot collapse and is securely coupled to the slot. The electronic device is now anti-theft ready.

In sum, the present disclosure provides a security lock for portable electronic devices for anti-theft purposes. The lock head of the lock is changeable such that users may switch different lock heads when needed. The security lock of the present disclosure is also ergonomically designed as the locking mechanism is elevated from the lock head. As such, the easiness and convenience of lock operation and maneuverability are increased substantially because room is created for user's hand to operate the locking mechanism while the lock head stays at the same level as the interface of the electronic device. Undesired tilting of the electronic device during or after the installation of the lock is avoided.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A security apparatus for a portable device, comprising:

a lock head, having a plurality of lock fingers extending out of the lock head and alterable between a first state and a second state, the plurality of lock fingers are in the first state when the lock head is secured to an interface of a portable device, and the plurality of lock fingers are in the second state when the lock head is readily removable from the interface of the portable device; and a first engaging member; and a lock body, having:

a first compartment for receiving the lock head via an opening of the first compartment;

a second engaging member proximate to the opening and complementary to the first engaging member, the second engaging member engages with the first engaging member to secure the lock head to the lock body when the plurality of lock fingers are in the first state; and a second compartment for accommodating a locking mechanism operably coupled to the lock head, the state of the plurality of lock fingers being alterable via the locking mechanism.

2. The security apparatus of claim 1, wherein the plurality of lock fingers are in the second state when the first and second engaging member are disengaged and the lock head is readily removable from the lock body to be replaced by a different lock head.

3. The security apparatus of claim 1, wherein the plurality of lock fingers shift in horizontal direction to increase friction with an inner wall of the interface.

4. The security apparatus of claim 1, wherein the lock head has a first longitudinal axis extending from a distal end to an opposite proximal end of the lock head, and the locking mechanism has a second longitudinal axis extending from a distal end to an opposite proximal end of the locking mechanism, wherein the first longitudinal axis is offset from the second longitudinal axis for a distance.

5. The security apparatus of claim 4, wherein the first longitudinal axis and the second longitudinal axis are non-coaxial.

6. The security apparatus of claim 5, wherein the first longitudinal axis and the second longitudinal axis are parallel to each other.

7. The security apparatus of claim 4, wherein the lock body includes a bottom, and the second longitudinal axis is ≤3 millimeters above the bottom.

8. The security apparatus of claim 1, wherein the lock body includes a bottom, and the plurality of lock fingers are no more than 2.6 millimeters above the bottom.

9. The security apparatus of claim 1, wherein the lock head further comprises a fixing element configured to prevent the lock head from being removed from the lock body when the plurality of lock fingers are in the second state.

10. The security apparatus of claim 1, wherein the lock body further includes a stabilizing element adapted to alter the states of the plurality of lock fingers corresponding to the locking mechanism's operation.

11. The security apparatus of claim 10, wherein the stabilizing element is slidable between a first position and a second position, and the stabilizing element is in the first position when the plurality of lock fingers are in the first state, and the first position is closer to the interface than the second position.

12. The security apparatus of claim 1, wherein the locking mechanism further includes a switch adapted to hold the plurality of lock fingers in the first state and to release the plurality of lock fingers from the first state.

13. The security apparatus of claim 1, wherein the lock head sits on a first plane which passes through a central longitudinal axis of the lock head, and the locking mechanism sits on a second plane which passes through a central longitudinal axis of the locking mechanism, and the first plane and the second plane are spaced apart.

14. The security apparatus of claim 13, wherein the first and second planes are horizontal planes.

15. The security apparatus of claim 14, wherein the lock body includes a bottom, and the second horizontal plane is ≤3 millimeters above the bottom.

16. The security apparatus of claim 1, wherein the lock head is pre-installed and not readily removable from the lock body.

* * * * *